United States Patent
Woodruff et al.

(10) Patent No.: US 12,311,711 B2
(45) Date of Patent: May 27, 2025

(54) JACK ASSEMBLY FOR TRAILER HITCH

(71) Applicant: Pro Pride Industries, Inc., Holly, MI (US)

(72) Inventors: Sean Woodruff, Grand Blanc, MI (US); Wesley Franklin Mishler, Byron, MI (US)

(73) Assignee: PRO PRIDE INDUSTRIES, INC., Holly, MI (US)

( * ) Notice: Subject to any disclaimer, the term of this patent is extended or adjusted under 35 U.S.C. 154(b) by 809 days.

(21) Appl. No.: 17/572,764

(22) Filed: Jan. 11, 2022

(65) Prior Publication Data
US 2023/0219388 A1    Jul. 13, 2023

(51) Int. Cl.
| | |
|---|---|
| B60D 1/30 | (2006.01) |
| B60D 1/06 | (2006.01) |
| B60D 1/07 | (2006.01) |
| B60D 1/24 | (2006.01) |
| B60D 1/52 | (2006.01) |
| B60D 1/58 | (2006.01) |

(52) U.S. Cl.
CPC .............. *B60D 1/30* (2013.01); *B60D 1/065* (2013.01); *B60D 1/075* (2013.01); *B60D 1/247* (2013.01); *B60D 1/52* (2013.01); *B60D 1/58* (2013.01)

(58) Field of Classification Search
CPC . B60D 1/247; B60D 1/30; B60D 1/58; B60D 1/583; B60D 1/06; B60D 1/167; B60D 1/46; B66B 3/08; B66F 3/10; B66F 5/025; B66F 7/14; B66F 13/00
See application file for complete search history.

(56) References Cited

U.S. PATENT DOCUMENTS

| | | | | |
|---|---|---|---|---|
| 4,213,627 A | * | 7/1980 | Thompson | B60D 1/065 280/455.1 |
| 4,230,333 A | * | 10/1980 | Persyn | B60D 1/345 280/406.2 |
| 6,286,851 B1 | * | 9/2001 | Sargent | B60D 1/075 280/455.1 |
| 6,860,501 B2 | * | 3/2005 | Schmidt | B60D 1/665 280/455.1 |
| 7,857,344 B2 | | 12/2010 | Hensley | |
| 2002/0036390 A1 | * | 3/2002 | Sargent | B60D 1/247 280/455.1 |
| 2008/0277903 A1 | * | 11/2008 | Anderson | B60D 1/30 280/504 |
| 2009/0033061 A1 | * | 2/2009 | Hensley | B60D 1/58 280/477 |
| 2015/0089847 A1 | * | 4/2015 | Gross | E02F 3/308 37/445 |

(Continued)

*Primary Examiner* — Christopher B Wehrly
(74) *Attorney, Agent, or Firm* — Carlson, Gaskey & Olds, P.C.

(57) ABSTRACT

A hitch assembly includes a jack assembly that includes a base that includes a frame rail passage. A telescoping assembly that extends along a central longitudinal axis includes an outer tube fixed to the base. An inner tube moveable along the central longitudinal axis within the outer tube to adjust a length of the telescoping tube assembly. A link assembly includes a first spherical end link attached to the telescoping assembly with a first spherical joint. A second spherical end link is fixed relative to the first spherical end link and has a second spherical joint. A spring bar is pivotably attached to the first spherical link end.

20 Claims, 19 Drawing Sheets

(56) References Cited

U.S. PATENT DOCUMENTS

| | | | | |
|---|---|---|---|---|
| 2018/0246068 A1* | 8/2018 | Yu | ............................ | G01N 29/28 |
| 2021/0329833 A1* | 10/2021 | Steiner | ................... | A01D 34/52 |
| 2022/0111691 A1* | 4/2022 | Few | ......................... | B60D 1/50 |
| 2023/0074805 A1* | 3/2023 | Hall | ......................... | B60D 1/06 |

* cited by examiner

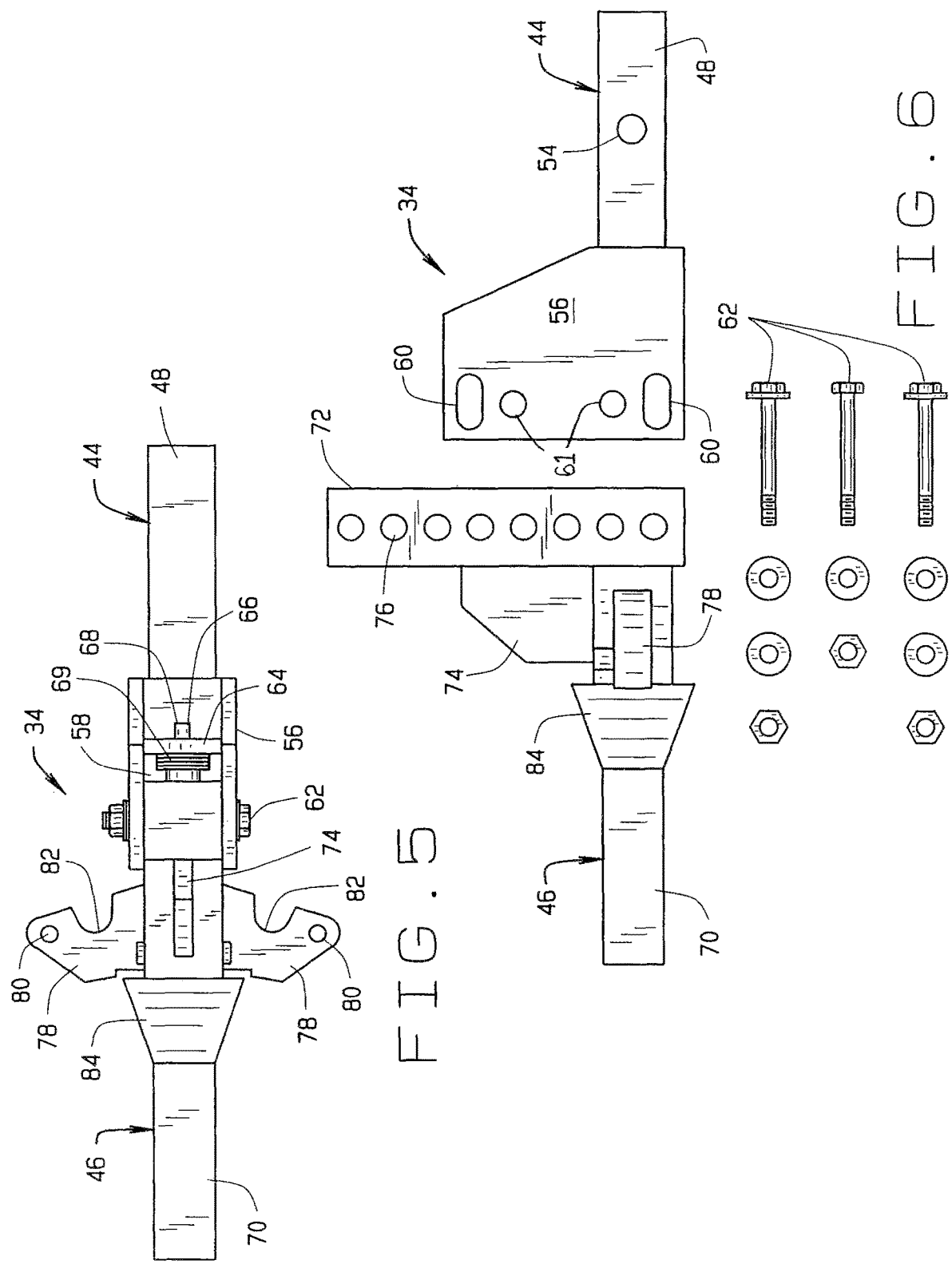

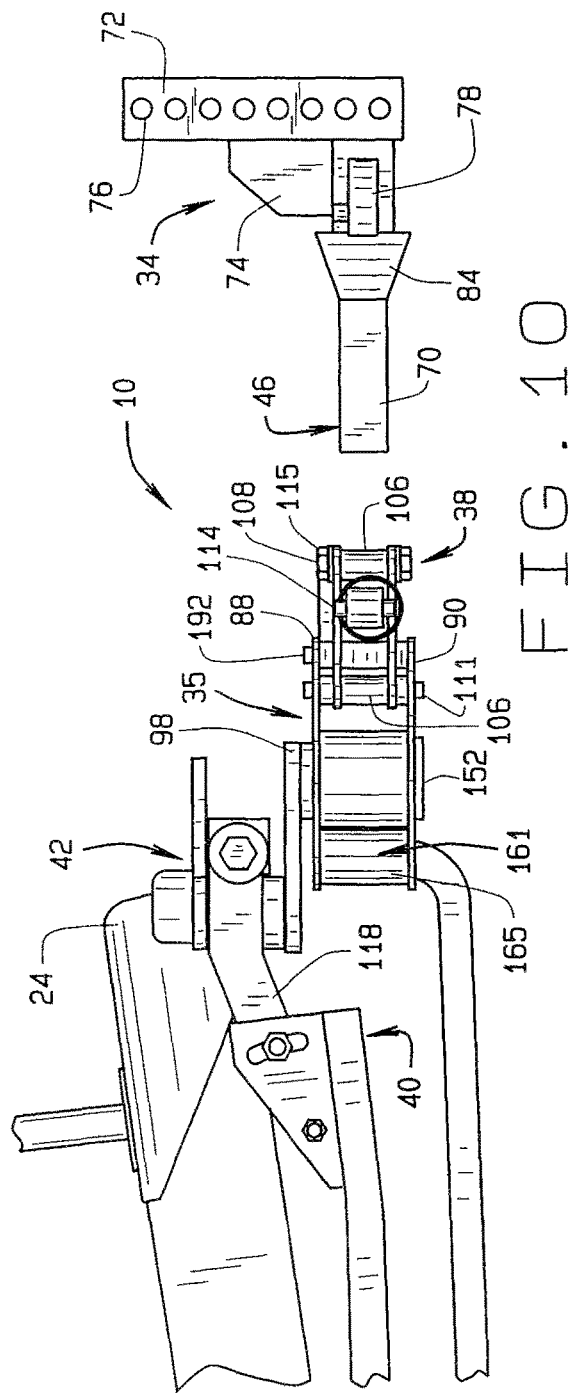
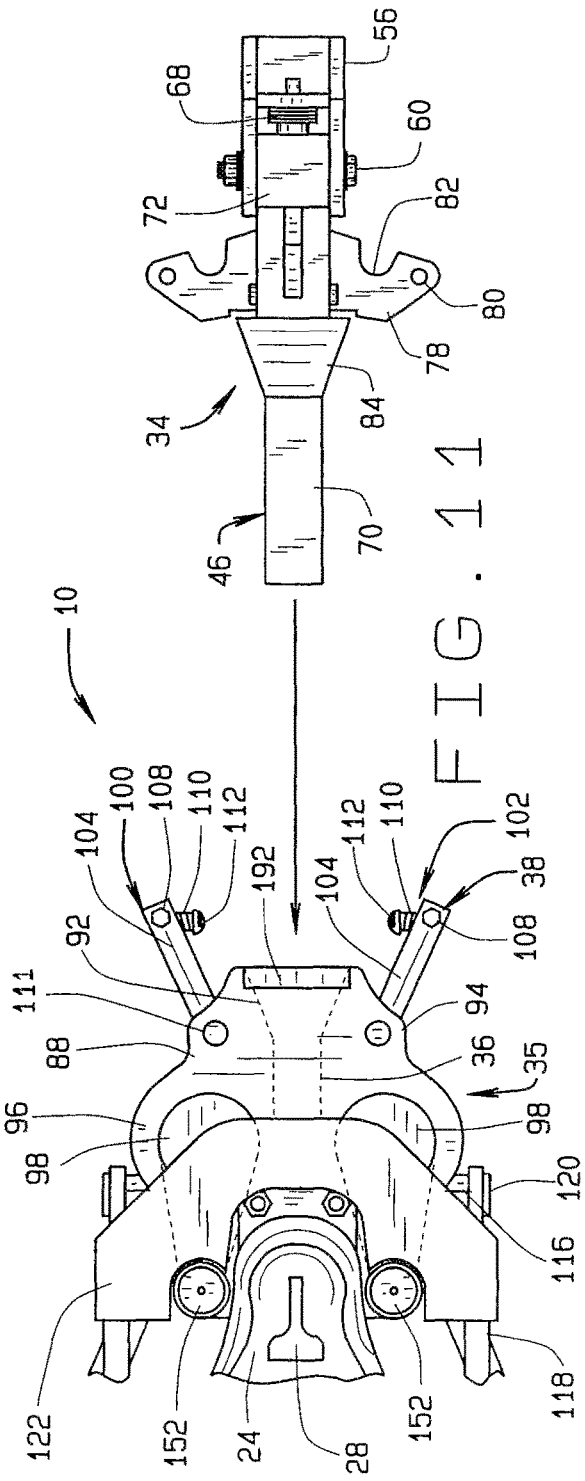

JACK ASSEMBLY FOR TRAILER HITCH

BACKGROUND

This application relates to a trailer hitch, and more particularly to a jack assembly for a weight distribution trailer hitch.

As trailer loads increase, tongue weight also increases. When tongue weight increases too much, it pushes down the rear of the tow vehicle. To counteract this, a weight distribution hitch uses spring bars attached to a ball mount and a trailer frame to distribute the tongue weight among all the tow vehicle wheels and all the trailer wheels. As a result, the tow vehicle remains nearer to level from front to back while the trailer is attached.

SUMMARY

In one exemplary embodiment, a jack assembly includes a base that includes a frame rail passage. A telescoping assembly extends along a central longitudinal axis and includes an outer tube fixed to the base. An inner tube is moveable along the central longitudinal axis within the outer tube to adjust a length of the telescoping tube assembly. A link assembly includes a first spherical end link attached to the telescoping assembly with a first spherical joint. A second spherical end link fixed relative to the first spherical end link and has a second spherical joint.

In another embodiment according to any of the previous embodiments, the base includes a base plate and a U-shaped bracket defining the frame rail passage.

In another embodiment according to any of the previous embodiments, the base plate includes a base plate opening surrounded by a distal end of the outer tube with the inner tube extending through the base plate opening.

In another embodiment according to any of the previous embodiments, a tube gusset directly engages the base plate and the outer tube. A bracket gusset directly engages the U-shaped bracket and the base plate.

In another embodiment according to any of the previous embodiments, the telescoping assembly includes a threaded shaft that extends along the central longitudinal axis. A drive head at a proximal end of the threaded shaft. An end plate fixed adjacent a proximal end of the threaded shaft. A threaded collar fixed to the inner tube and in threaded engagement with the threaded shaft for moving the inner tube longitudinally along the central longitudinal axis.

In another embodiment according to any of the previous embodiments, the end plate is supported on a bearing assembly to rotate relative to the outer tube.

In another embodiment according to any of the previous embodiments, a lock plate that is rotationally fixed relative to the outer tube has at least one pin opening. The at least one pin opening in the lock plate is configured to align with at least one pin opening on the end plate to fix the lock plate from rotating relative to the end plate.

In another embodiment according to any of the previous embodiments, a locking pin extends through one of the at least one opening in the lock plate. One of the at least one pin openings in the end plate to limit rotation of the lock plate with respect to the end plate.

In another embodiment according to any of the previous embodiments, a first pair of pivoting arms having proximal ends pivotably attached to the inner tube. Distal ends are pivotably attached to the first spherical joint.

In another embodiment according to any of the previous embodiments, an inner tube fastener extends through the proximal ends of the pair of pivoting arms and the inner tube. A first link fastener extends through the distal ends of the pair of pivoting arms and the first spherical joint.

In another embodiment according to any of the previous embodiments, the second spherical joint of the second spherical end link is connected to a spring bar.

In another embodiment according to any of the previous embodiments, a second link fastener extends through the second spherical joint. A mounting bracket attaches to the spring bar.

In another embodiment according to any of the previous embodiments, the first spherical joint includes a first ring that has a first insert with a first opening for accepting the first link fastener. The second spherical joint includes a second ring that has a second insert with a central opening for accepting the second link fastener.

In another embodiment according to any of the previous embodiments, the mounting bracket defines a channel for accepting the second ring of the second spherical joint. At least one spring bar fastener opening extends through a base of the channel for accepting a fastener aligned with an opening in the spring bar.

In another exemplary embodiment, a hitch assembly includes a jack assembly that includes a base that includes a frame rail passage. A telescoping assembly that extends along a central longitudinal axis includes an outer tube fixed to the base. An inner tube moveable along the central longitudinal axis within the outer tube to adjust a length of the telescoping tube assembly. A link assembly includes a first spherical end link attached to the telescoping assembly with a first spherical joint. A second spherical end link is fixed relative to the first spherical end link and has a second spherical joint. A spring bar is pivotably attached to the first spherical link end.

In another embodiment according to any of the previous embodiments, the telescoping assembly includes a threaded shaft that extends along the central longitudinal axis. A drive head at a proximal end of the threaded shaft. An end plate fixed adjacent a proximal end of the threaded shaft. A threaded collar fixed to the inner tube and in threaded engagement with the threaded shaft for moving the inner tube longitudinally along the central longitudinal axis.

In another embodiment according to any of the previous embodiments, a lock plate that is rotationally fixed relative to the outer tube has at least one pin opening. The at least one pin opening in the lock plate is configured to align with at least one pin opening on the end plate to fix the lock plate from rotating relative to the end plate.

In another embodiment according to any of the previous embodiments, a locking pin extends through one of the at least one opening in the lock plate and one of the at least one pin openings in the end plate to limit rotation of the lock plate with respect to the end plate.

In another embodiment according to any of the previous embodiments, a first pair of pivoting arms having proximal ends pivotably attached to the inner tube and distal ends pivotably attached to the first spherical joint. An inner tube fastener extends through the proximal ends of the pair of pivoting arms and the inner tube. A first link fastener extends through the distal ends of the pair of pivoting arms and the first spherical joint. A second link fastener extending through the second spherical joint. A mounting bracket attaches to the spring bar.

In another embodiment according to any of the previous embodiments, the first spherical joint includes a first ring having a first insert with a first opening for accepting the first link fastener. The second spherical joint includes a second ring having a second insert with a central opening for accepting the second link fastener. The mounting bracket defines a channel for accepting the second ring of the second spherical joint and at least one spring bar fastener opening extends through a base of the channel for accepting a fastener aligned with an opening in the spring bar.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 5 is a top plan view of the adjustable hitch bar assembly.

FIG. 6 is a side view of an unassembled adjustable hitch bar assembly.

FIG. 10 is a side view of the front member containing the assembly positioned for connection with the adjustable hitch bar assembly.

FIG. 11 is a top view of the front member containing the assembly positioned for connection with the adjustable hitch assembly.

DETAILED DESCRIPTION

Figure 1:
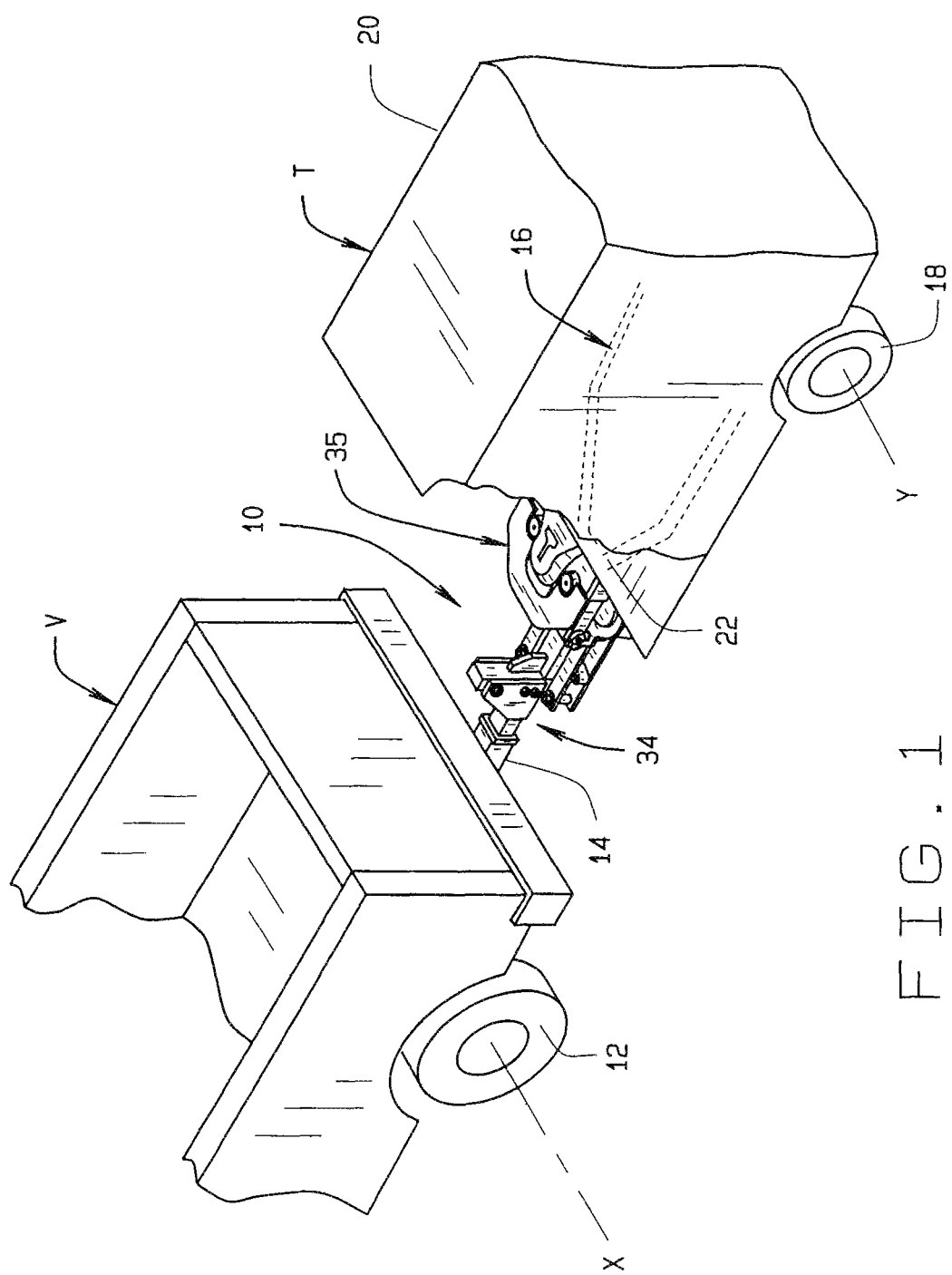
FIG. 1 is a perspective view of a trailer connected to a tow vehicle with an example hitch assembly constructed in accordance with the present disclosure.

As shown in FIGS. 1-23, a tow vehicle V is coupled to a trailer T with an example hitch assembly 10. Those skilled in the art will appreciate that the tow vehicle V can be any conventional automobile, a van, or truck such as the pickup shown in FIG. 1. Further, as used in the specification and the claims, the term trailer is intended to include any type of towable device or vehicle that can be pulled behind or trails a tow vehicle. The tow vehicle V includes rear wheels 12 which revolve about an axis X. The tow vehicle V includes a conventional hitch receiver 14, which is appropriately secured to the tow vehicle V in any conventional or accepted manner.

Figure 2:
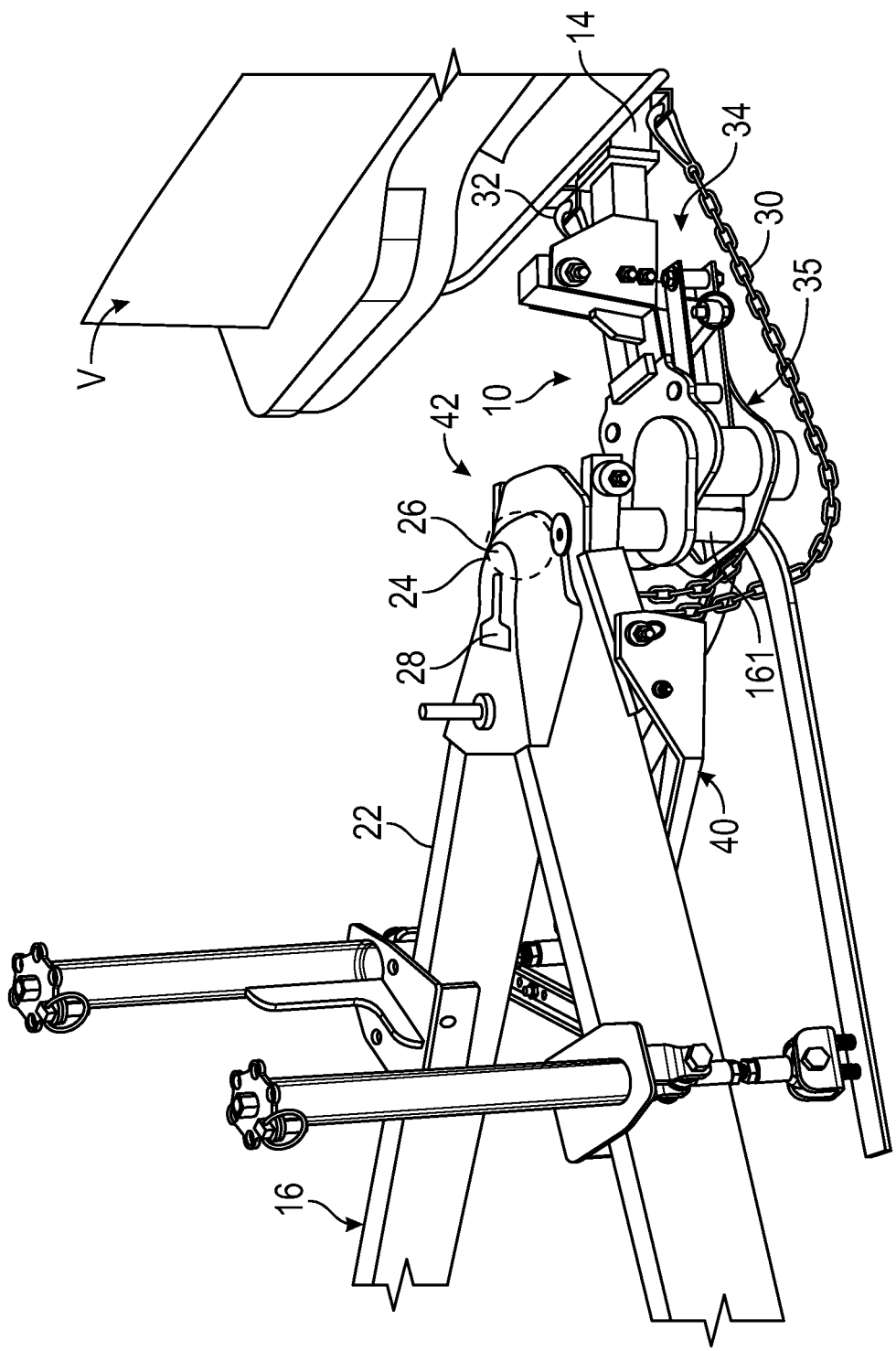
FIG. 2 is an enlarged perspective view of the trailer connected to the tow vehicle with the hitch assembly.

The trailer T has a frame 16 which is supported on wheels 18 that revolve about a common axis Y, and the frame 16 in turn supports a trailer body 20. The front of the frame 16 forms a so-called tongue or A-frame, in that it has side members 22 which converge forwardly and are connected at their forward ends to a coupler 24 used to secure the trailer T to a hitch ball 26 of the hitch assembly 10 (FIG. 2). However, those skilled in the art will recognize that any type of trailer frame can be used. The coupler 24 is a generally spherical socket that opens downwardly and is sized to receive a conventional trailer hitch ball. The coupler 24 also has a conventional locking device 28 which will close upon the hitch ball 26 and retain it in the socket. A typical trailer also includes safety chains 30 and an electric plug 32.

As shown in FIGS. 1-13, the hitch assembly 10 comprises an adjustable hitch bar assembly 34, a front member 35 containing a hitch box 36, an over-center latch assembly 38, a yoke assembly 40, and a rear member 42. The hitch assembly 10 connects the tow vehicle V to the trailer T for transferring the pulling and stopping forces of the tow vehicle V to the trailer T.

Figure 3:
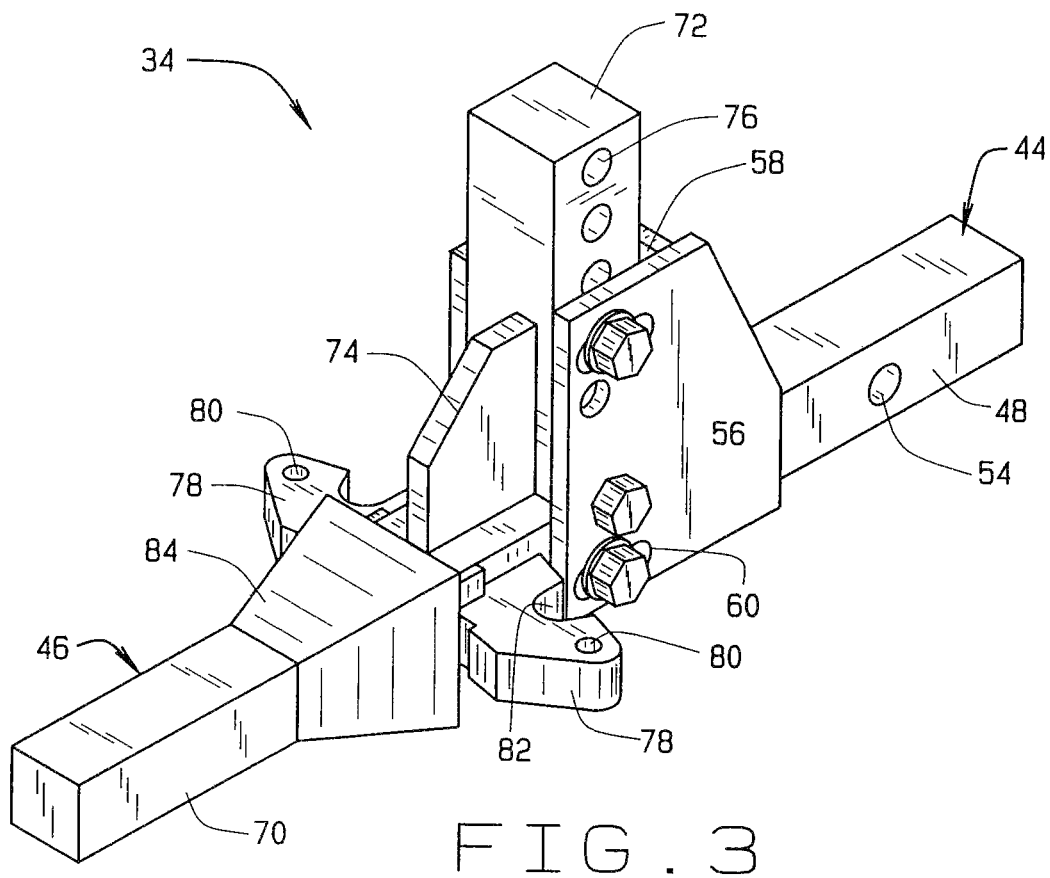
FIG. 3 is a perspective view of an adjustable hitch bar assembly.
Figure 4:
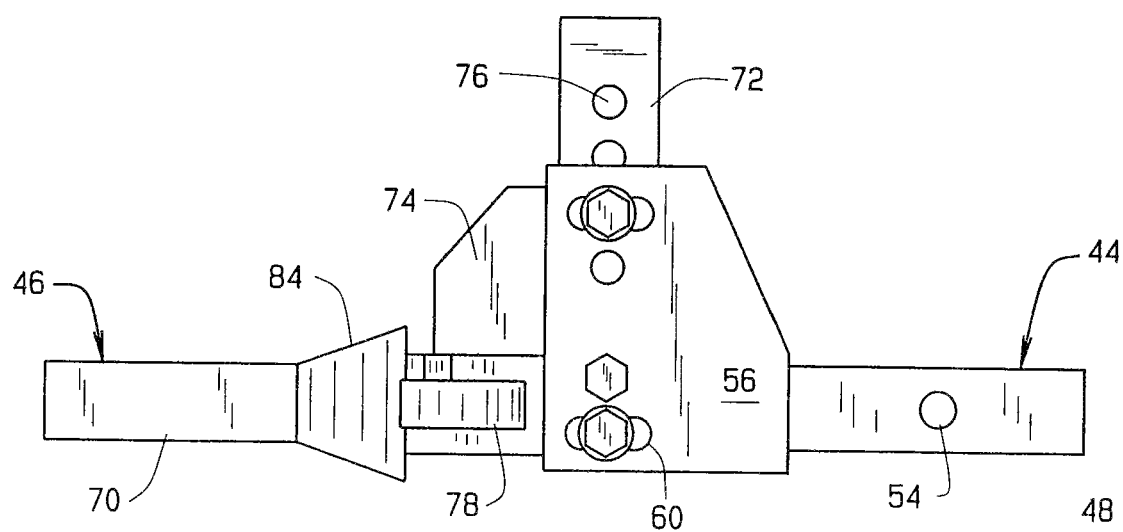
FIG. 4 is a side view of the adjustable hitch bar assembly.
Figure 7:
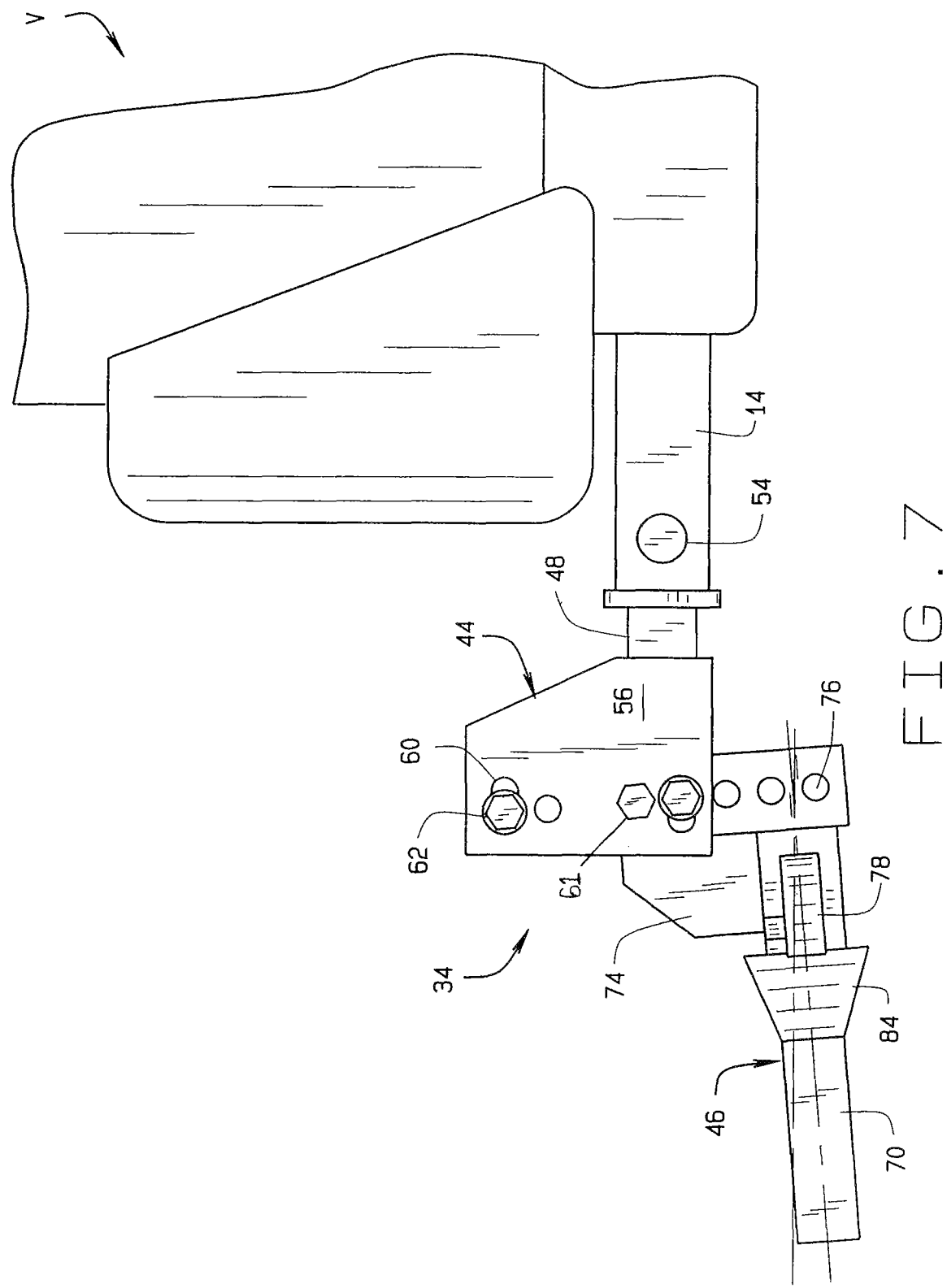
FIG. 7 is a side view of the adjustable hitch bar assembly connected to the tow vehicle in a declined position.
Figure 8:
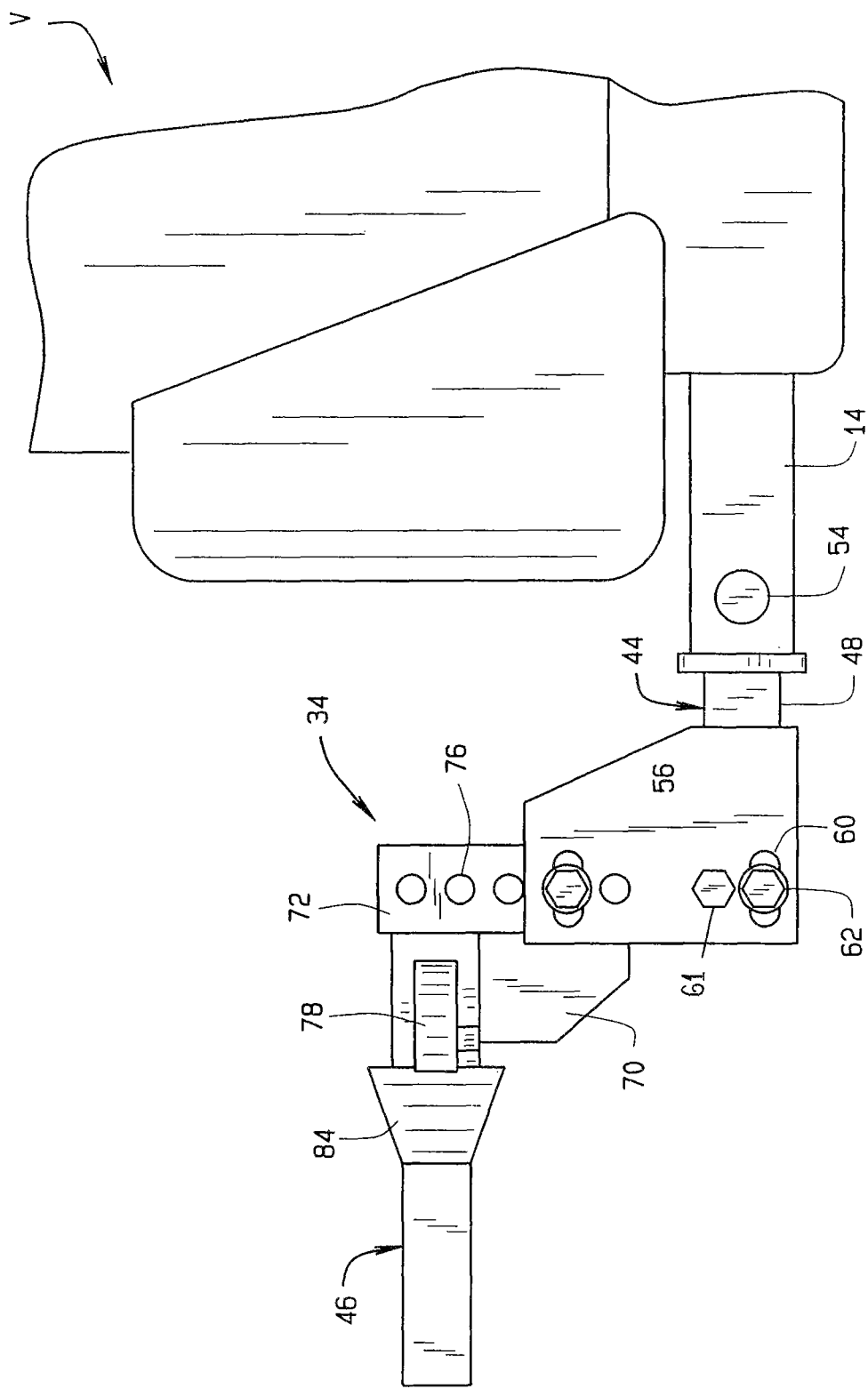
FIG. 8 is a side view of the adjustable hitch bar assembly connected to the tow vehicle in an inverted position.
Figure 9:
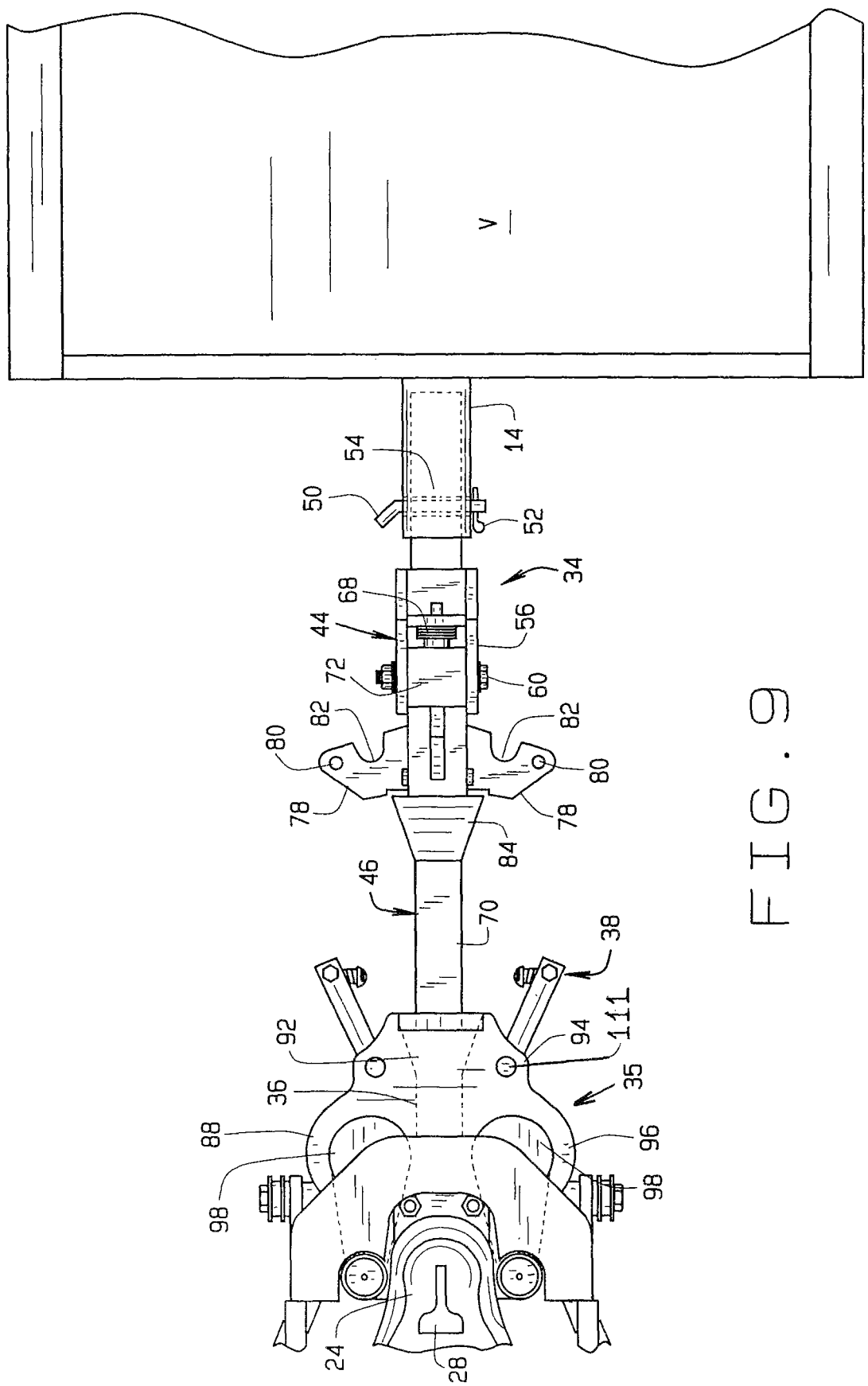
FIG. 9 is a top view of a front member containing a hitch box positioned for connection with the adjustable hitch bar assembly and the tow vehicle.
Figure 12:
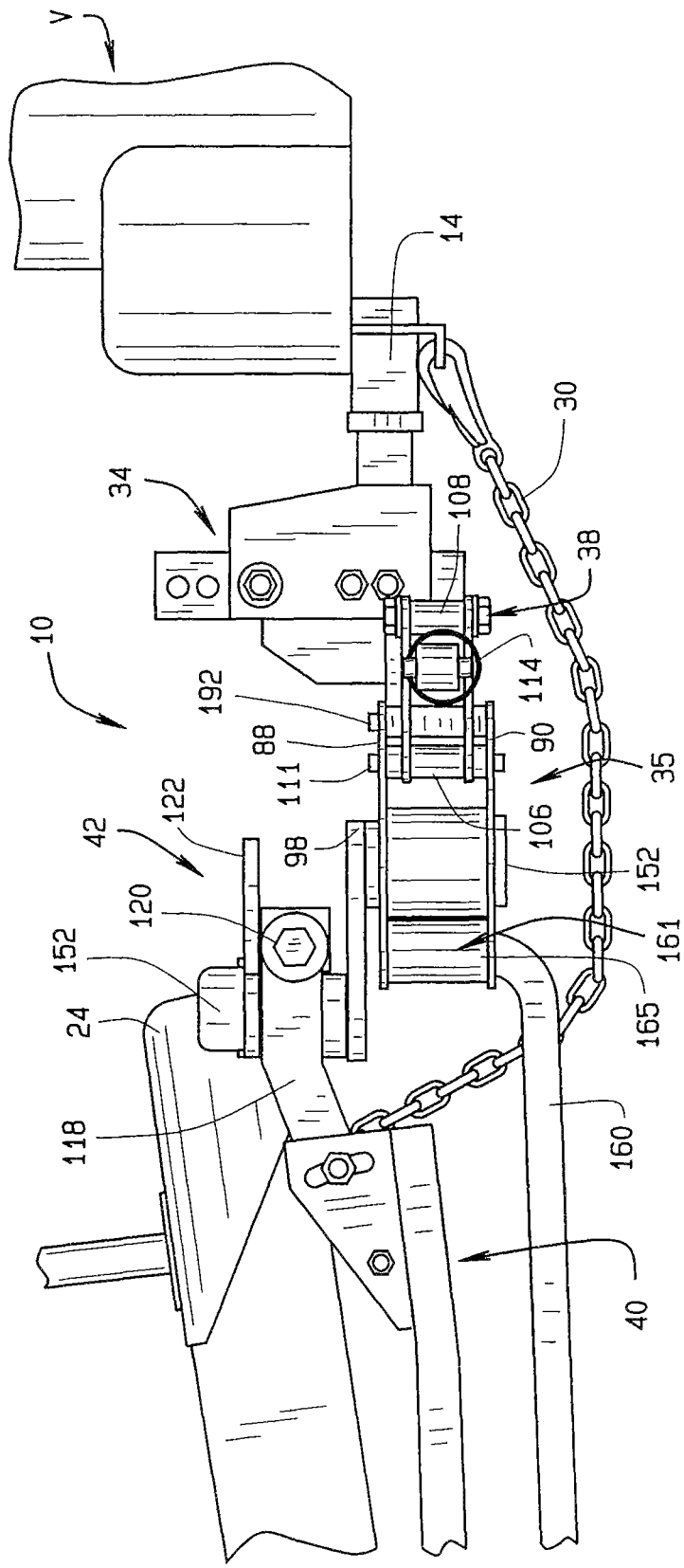
FIG. 12 is a partial side view of the hitch assembly.

As shown in FIGS. 3-9, the adjustable hitch bar assembly 34 adjusts to accommodate elevation and angle differences between the hitch receiver 14 and the front member 35 containing the hitch box 36. To this end, the adjustable hitch bar assembly 34 includes a vehicle portion 44 adjustably and removably attached to a trailer portion 46. The vehicle portion 44 is a generally square bar 48 that inserts into the hitch receiver 14 and projects rearwardly in a generally horizontal orientation with its longitudinal axis along the centerline of the tow vehicle V. The bar 48 fits snugly into the hitch receiver 14 with very little clearance and is secured by inserting a standard hitch pin 50 and clip 52 into corresponding through holes 54 (FIG. 9). Two attachment plates 56 attach, such as by welding, to the opposite end of the bar 48, thereby defining a channel 58 between the plates 56 for receiving the trailer portion 46 (FIG. 3). Slots 60 and pivot hole 61 for receiving fasteners 62 provide adjustable engagement with the trailer portion 46 (FIG. 6). In operation, the trailer portion pivots about the pivot hole 61 for positioning relative to the vehicle portion 44. A crosspiece 64 extends between the two attachment plates 56 and defines a hole 66 for receiving a pin 68 with spacers 69 slid over the pin 68 (FIG. 5).

The trailer portion 46 is a generally square bar 70 that inserts into the hitch box 36 and projects forwardly in a generally horizontal orientation with its longitudinal axis along the centerline of the tow vehicle V (FIG. 9). An upright 72 extends perpendicularly from an end of the bar 70 and is positioned to insert into the channel 58 of the vehicle portion 46 (FIGS. 5-6). A support 74 attaches between the bar 70 and the upright 72, such as by welding, to provide additional strength to the trailer portion 46. A plurality of holes 76 in the upright 72 provide for adjustable engagement with the slots 60 of the attachment plates 56 of the vehicle portion 44 using fasteners 62. As shown in FIGS. 3-7, the plurality of holes 76 along the upright 72 allow the trailer portion 46 to engage the vehicle portion 44 at multiple elevations. For even further elevation options, the trailer portion 46 can be inverted (FIG. 8) or the vehicle portion 44 can be inverted. The slots 60 allow the trailer portion 44 to be positioned at multiple angles relative to the vehicle portion 44 (FIG. 7), such as about 8° to 10°. The upright 72 rests against the pin 68 with spacers 69 to secure the upright 72 at the desired angle (FIG. 5). The number of spacers 69 can be added or removed to achieve different angles for the trailer portion 46 relative to the vehicle portion 44.

The trailer portion 46 includes over-center latch tabs 78 welded to each side of the bar 70 at about the mid-section (FIG. 3). The tabs 78 project laterally from the bar 70 and define through holes 80, concave recesses 82, for coupling with the over-center latch assembly 38 to be described below. The adjustable hitch bar assembly 34 also includes a stop 84 welded to each side of the bar 70 and positioned to the rear of the tabs 78 for mating with the hitch box 36 to be described below (FIG. 9). The stops 84 are wedges with beveled faces facing rearwardly with an angle of about 14°. Such a steep angle allows for easier engagement between the bar 70 and the hitch box 36.

As shown in FIGS. 9-13, the front member 35 includes a generally rectangular hitch box 36 joined between an upper plate 88 and a lower plate 90. The hitch box 36 comprises angular walls 92 joined to form a partially funnel-shaped enclosure that narrows from a front end towards a back end for receiving the adjustable hitch bar assembly 34. The interior dimensions of the angular walls 92 should provide enough clearance so the bar 70 of the trailer portion 46 can extend to the rear of the hitch box 36 when inserted. In addition, the walls 92 are angled to match the beveled faces of the stops 84 of the adjustable hitch bar assembly 34 for proper seating. The upper plate 88 and lower plate 90 include four front holes 94 for attaching the over-center latch assembly 38 and four back holes 96 for attaching converging links 98.

As shown in FIGS. 9-13, the over-center latch assembly 38 is similar to the one disclosed in U.S. Pat. No. 4,811,967, which is used to secure the front member 35 containing the hitch box 36 to the adjustable hitch bar assembly 34. The over-center latch assembly 38 includes a left latch 100 and right latch 102 each comprising a pair of connecting links 104, a vertical tube 106, a pivot pin 108, a thrust link 110, a latch pin 111, and a safety pin 114. Each connecting link 104 is a straight bar defining front through holes and back through holes. The pair of connecting links 104 are connected in parallel by hingedly attaching the pivot pin 108 between the front holes and by fixedly attaching the hollow vertical tube 106 between the back holes. The pivot pin 108 defines a transversely directed threaded bore for receiving the thrust link 110 located midway between the two connecting links 104. The thrust link 110 is a threaded rod with a cross head 112 which inserts into the threaded bore of the pivot pin 108 so the surface of the cross head 112 is presented away from the pivot pin 108 for engaging the latch tabs 78 of the adjustable hitch bar assembly 34. The thrust link 110 can be screwed either in or out of the threaded bore to allow for any adjustment needed to ensure a tight fit with the latch tabs 78. To rotate the pivot pin 108 and thrust link 110 about a vertical axis, hexagonal heads 115 are attached to each end of the pivot pin 108. The hexagonal heads 115 can be engaged by a conventional end, socket or box wrench to rotate the pivot pin 108 and thrust link 110 to engage and disengage the adjustable hitch bar assembly 34. The left latch 100 and right latch 102 are attached to respective front holes 94 of the front member 35 containing the hitch box 36 by inserting each latch 100 and 102 in between the top and bottom front holes 94 so the vertical tubes 106 align with the through holes. To secure both latches 100 and 102, latch pins 112 are inserted through the front holes 94 into the vertical tubes 106 so the latches 100 and 102 can rotate about a vertical axis. For additional security, the latch pins 111 can be secured with cotter pins or other suitable means.

To secure the adjustable hitch bar assembly 34 to the front member 35, the bar 70 of the adjustable hitch bar assembly 34 inserts into the hitch box 36 until the stops 84 seat against the walls 92 of the hitch box 36. The latches 100 and 102 pivot from a slightly outward direction to a slightly inward position, referred to as the over-center position so the connecting links 104 rest against a reinforcement band 192 about the opening of the hitch box 36. A conventional end, socket or box wrench engages the hexagonal heads 115 of the pivot pins 108 and rotates the pivot pins 108 and thrust links 110 so the cross heads 112 engage the recesses 82 of the latch tabs 78, also referred to as the over-center position. In this position, the front member 35 is prevented from moving laterally or vertically with respect to the adjustable hitch bar assembly 34. Of course, the over-center latch assembly 38 prevents the front member 35 from pulling away from the adjustable hitch bar assembly 34. For extra safety, the safety pins 114 are inserted into the through holes 80 of the latch tabs 78. The safety pins 114 prevent the latches 100 and 102 from moving outwardly away from the over-center position. Of course, before anyone attempts to swing either latch 100 or 102 outwardly in order to disconnect the front member 35, the safety pins 114 must be removed.

The rear member 42 is a generally rectangular frame having a U-shaped lower member 116, which can comprise a lower plate and two end blocks 119, with yoke extensions 118 pivotally attached to each end of the lower member 116 and extending rearwardly for connecting to the yoke assembly 40 with fasteners 120 (FIGS. 9-13). A hitch ball 26 mounts to the lower member 116 at about the midpoint for receiving the coupler 24 of the trailer T. A front plate 117 extends across the front portion of the lower member 116. A generally C-shaped guard 122 extends between the yoke extensions 118.

The yoke assembly 40 includes two side members 124, each having a substantially parallel forward section 126 and an inwardly angled rear section 128. The rear sections 128 attach to a tail section 130, which includes a bar 132 with a tail tube 134 extending rearwardly. A crossbar 136 extends between the side members 124 to provide support. Attachment plates 138 extend upwardly from the forward section 126 to define a channel 140 for engagement with the yoke extensions 118. Slots 142 provide for adjustable engagement between the yoke assembly 40 and the yoke extension 118 to accommodate different couplers and different frame sizes.

In operation, the pulling and stopping forces are transmitted from the tow vehicle V through the hitch receiver 14 to the adjustable hitch bar assembly 34, from hitch bar assembly 34 to the hitch box 36 to the converging links 98, from the converging links 98 to the rear member 42, from the rear member 42 to the hitch ball 26, from the hitch ball 26 to the trailer coupler 24, from the trailer coupler 24 to the trailer frame 22.

Figure 13:
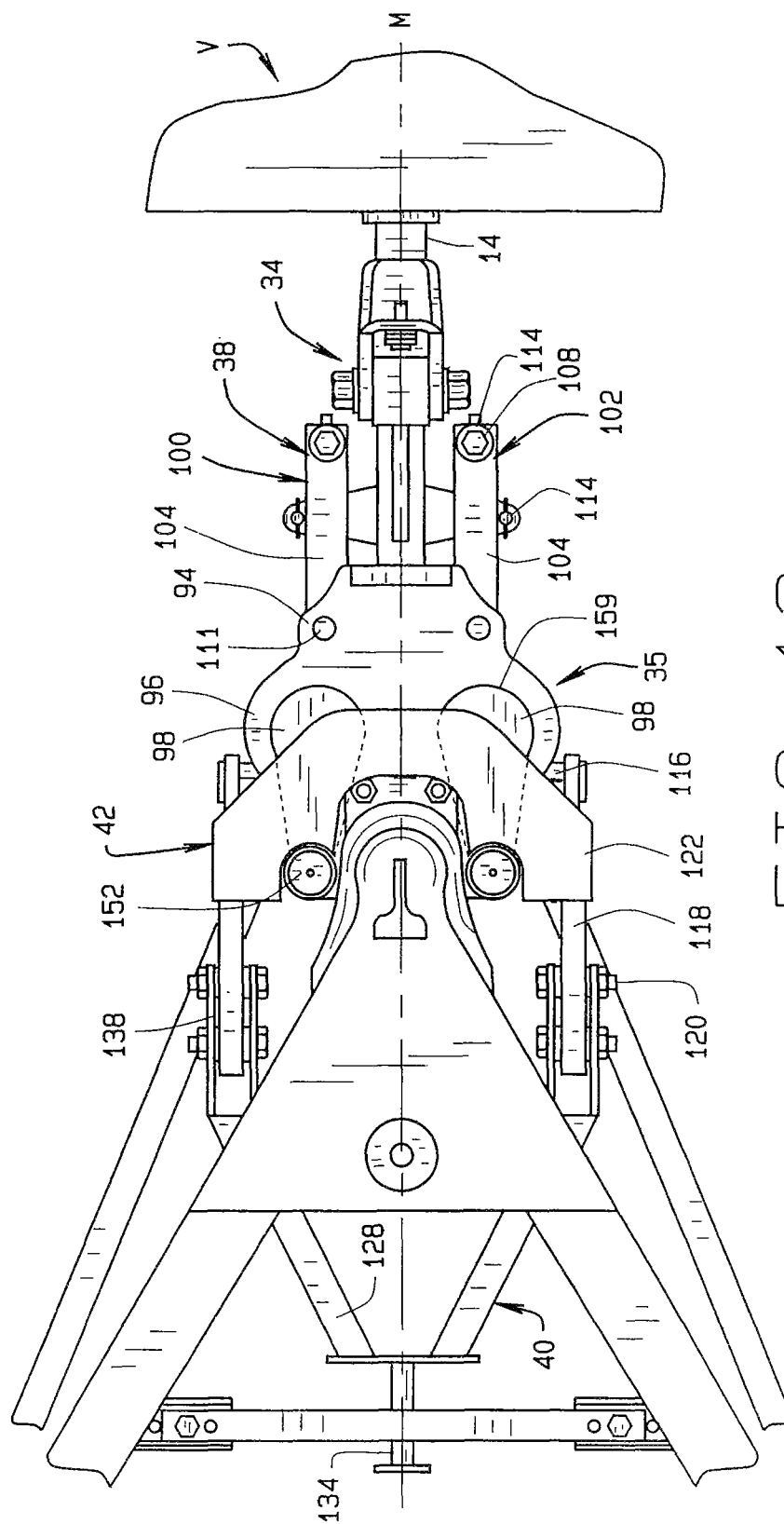
FIG. 13 is a partial top view of the hitch assembly during straight travel.
Figure 16:
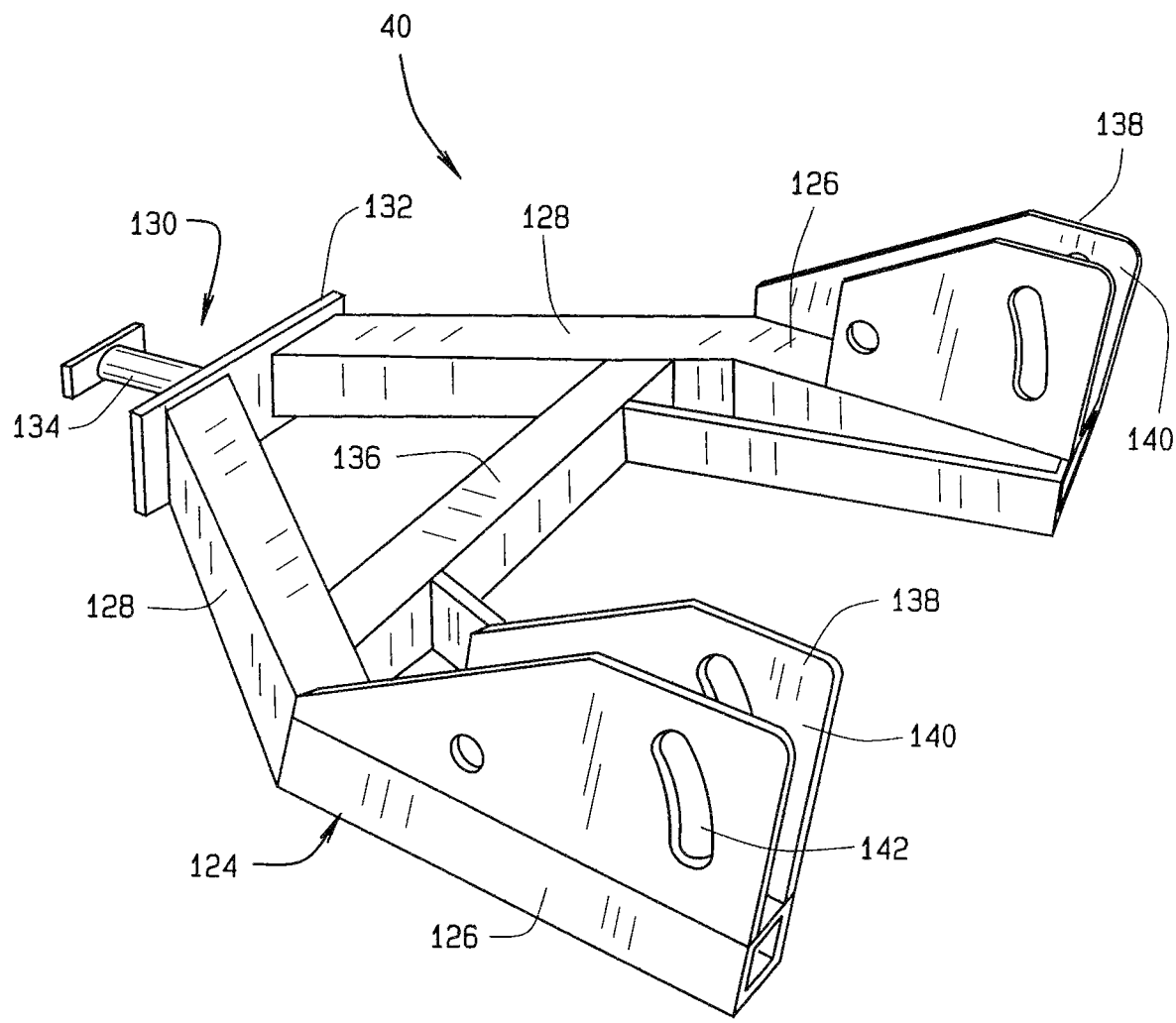
FIG. 16 is a perspective view of a yoke.
Figure 17:
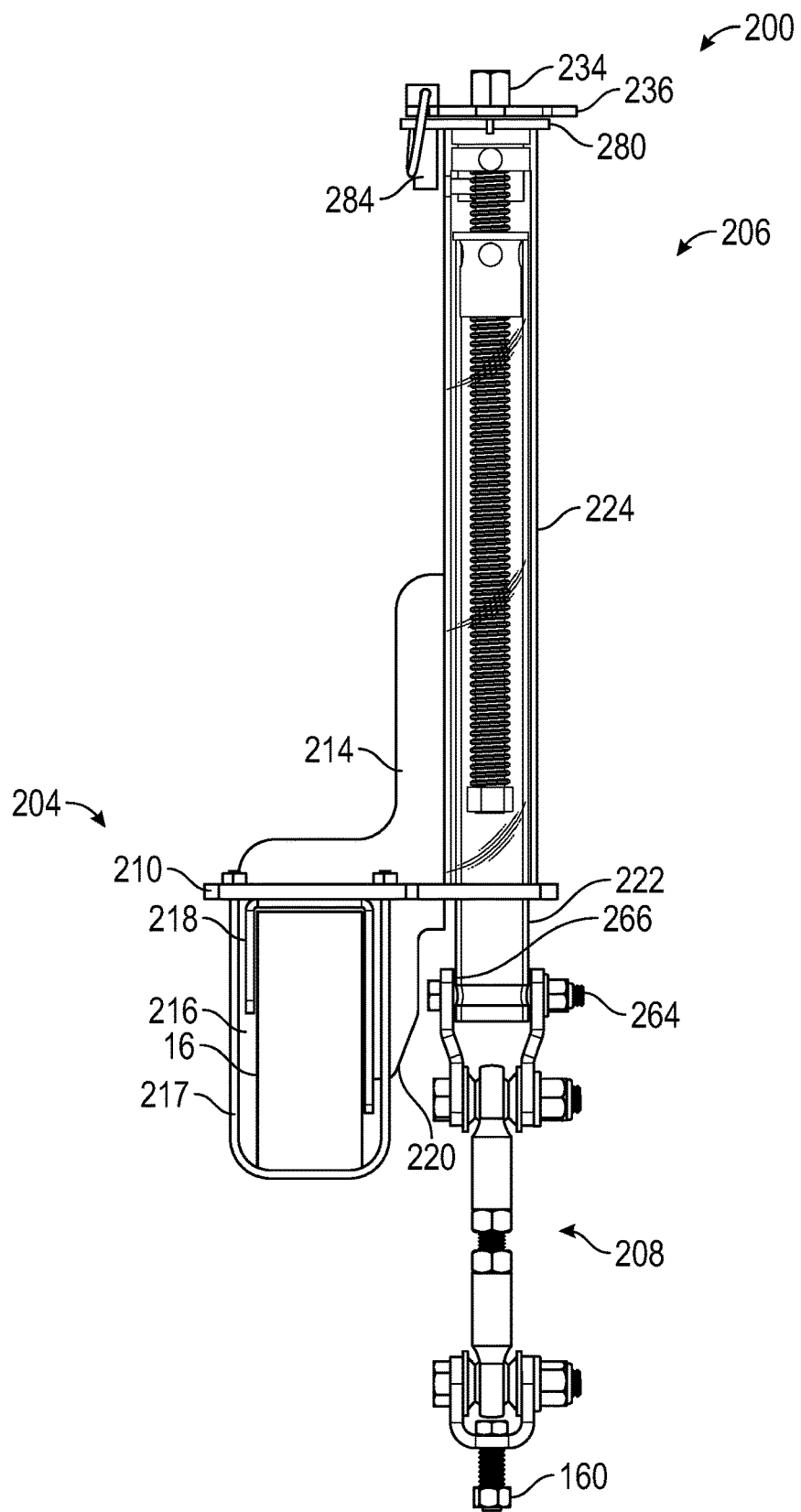
FIG. 17 is a partial rear perspective view of a jack assembly.

As shown in FIGS. 13, 16, and 17, the steering function of the hitch assembly 10 of the present disclosure is accomplished through a tail support assembly 150, a yoke assembly 40, and converging links 98. The tail support assembly 150, and converging links 98 effectively move the pivot axis for the hitch assembly 10 to near the rear axle of the tow vehicle V. This projection of the pivot axis provides the hitch assembly 10 with good lateral stability with little or no tendency to sway or fishtail when buffeted by cross winds or when otherwise subjected to lateral forces.

As described above, the rear of the yoke 40 has an extended tail tube 134 that engages the tail support assembly 150. The tail support assembly 150 comprises channels 153 extending inwardly from brackets 166 which are secured to the trailer frame 16 with fasteners 170, such as U-bolts. A crossbar 154 extends between and attaches to the channels 153, and a bracket 156 attaches to the underside of the crossbar 154 and extends downward so a roller 158 is parallel with the crossbar 154.

When assembled, the tail tube 134 rests snuggly inside the tail bracket 156. Although the roller 158 allows the tail tube 134 to move forward and backward along the longitudinal axis of the rear member 42, the tail bracket 156 restricts any other lateral movement of the tail tube 134. The ability to move forward and backward accommodates any movement created by uneven roads, since the trailer V remains parallel with the longitudinal axis of the tail support assembly 150 at all times.

The converging links 98 are straight links of equal length having bearings 152, such as tapered roller bearings, on each end for pivotally connecting the front member 35 to the rear member 42. When assembled, the converging links 98 are equidistant from the centerline M and converge forwardly (FIG. 13). The convergence is such that the links 98, if extended forwardly, will intersect along a centerline M perhaps ahead of the rear of the tow vehicle V, perhaps ahead of the rear wheels 12. When the trailer T is directly behind the tow vehicle V, the links 98 are symmetrically positioned. When the trailer T shifts to one side or the other during turns, the convergence intersection transfers to points which are closer to the front member 35 and offset from the centerline M. Together, the converging links 98 effectively move the pivot axis for the hitch assembly 10 to near the rear axle of the tow vehicle V.

Figure 14:
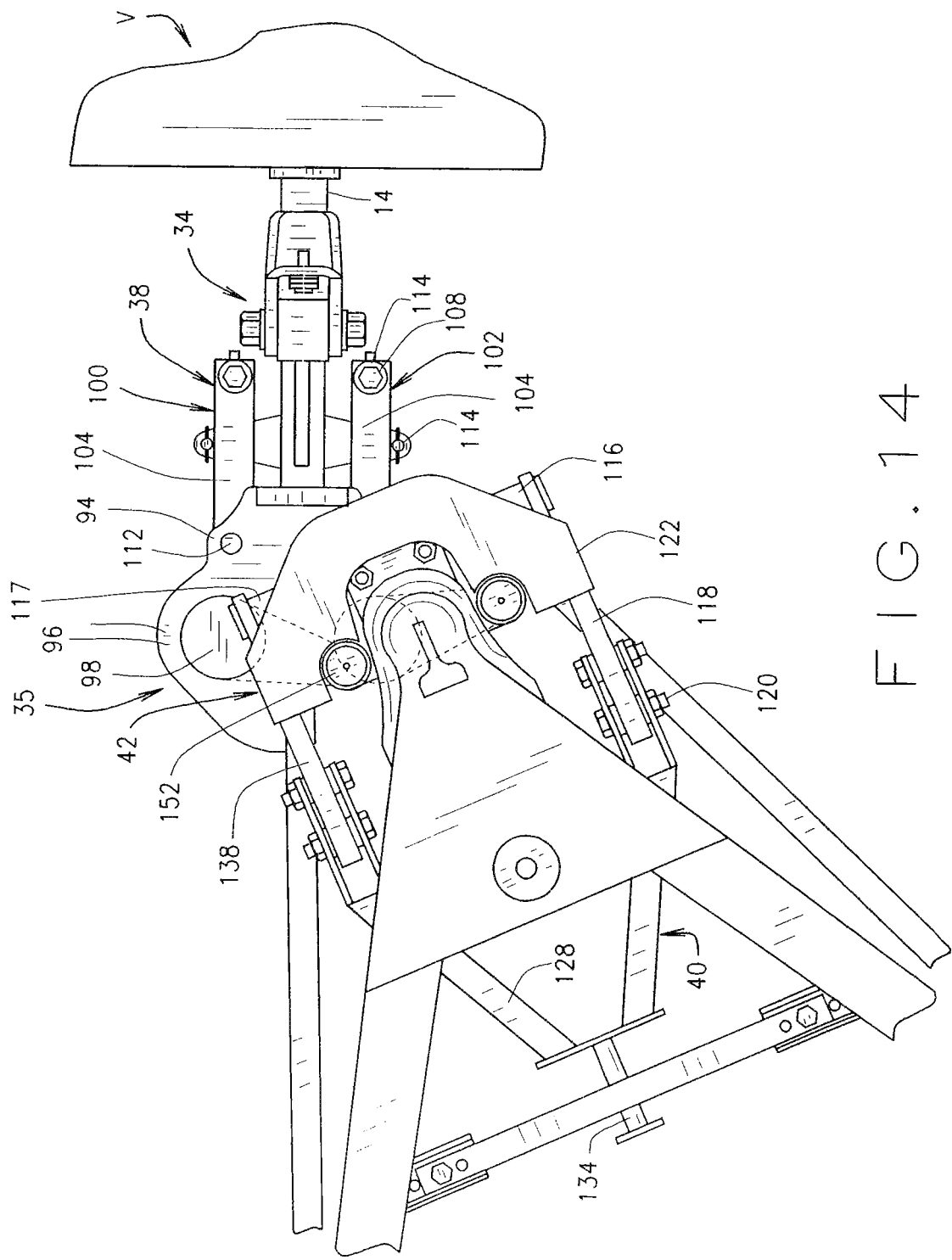
FIG. 14 is a partial top view of the hitch assembly during a slight turn.

The relative relationship of the elements of the hitch assembly 10 when the tow vehicle V and trailer T are negotiating turns are shown in FIG. 13-14. As the tow vehicle V turns relative to the trailer T, the adjustable hitch bar assembly 34 and front member 35 necessarily move in the direction of hitch receiver 14 on the tow vehicle V. Simultaneously, the converging links 98 pivot to allow turning while maintaining the effective hitch pivot axis near the rear of the tow vehicle V. As the individual links 98 pivot, the relative radius of the links 98 shorten drawing the rear member 42 forward towards the front member 35. The trailer T remains parallel with the longitudinal axis of the rear member 42 because the trailer T is rigidly attached with the yoke 40 along a generally horizontal plane to the rear member 42.

Where the tongue weight of the trailer T is quite heavy, it is desirable to redistribute the weight of the trailer T, so that more of it is carried by the wheels of the trailer T and the front wheels of the tow vehicle V and less of it by the rear wheels 12 of the tow vehicle V. To this end, spring bars 160 and the jack assembly 200 distribute the tongue weight among all the tow vehicle wheels 12 and all the trailer wheels 18.

As mentioned above, the spring bars 160 are attached to the rear portion of the front member 35 with bushings 161 (FIG. 10). The spring bars 160 extend rearwardly and horizontally at an outward angle to attach to the trailer frame 16 via the jack assembly 200 (FIG. 2). The outward angle positions the rear ends of the spring bars 160 into near alignment with the side members of the trailer's A-frame 16. The spring bars 160 also slope downward toward the rear to allow for tensioning.

Figure 15A:
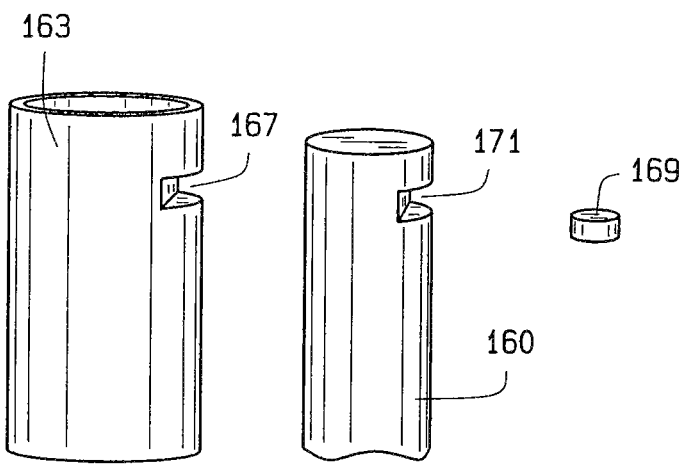
FIG. 15A is an exploded view of spring bar bushings.
Figure 15B:
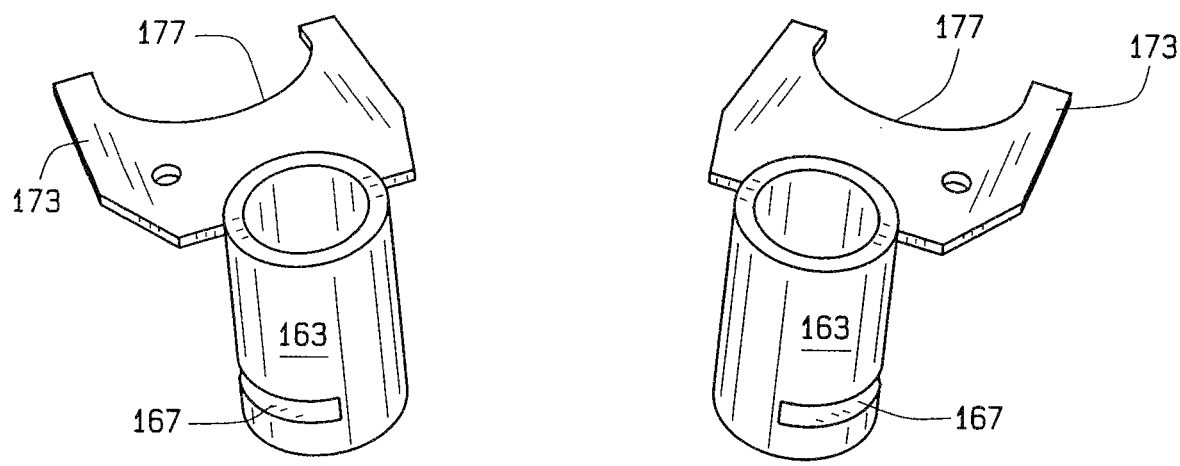
FIG. 15B is a perspective view of the spring bar bushing.
Figure 15C:
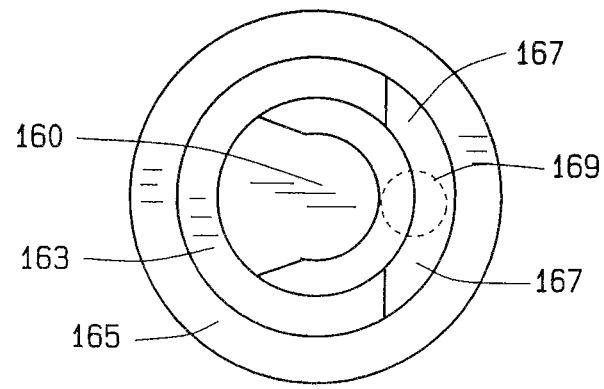
FIG. 15C is a top view of the spring bar bushings.

In the embodiment of FIGS. 1-23, the bushings 161 include an inner bushing 163 pivotally attached to the spring bar 160 and an outer bushing 165 attached to the front member 35. To assemble, the inner spring bar bushing 163 slides over the spring bar 160 until the slots 167 and 171 are aligned. The disk 169 inserts into the aligned slots 167 and 171 (FIG. 15). The spring bar 160 with inner spring bar bushing 163 and disk 169 in place inserts into the outer spring bar bushing 165. With the inner bushing 163 inserted into the outer bushing 165, the disk 169 is secured within the slots 167 and 171 and the spring bar 160 is secured even when no tension is applied to the spring bars 160. The disk 169 can move freely within the aligned slots 167 and 171 to prevent binding or breaking of parts during rotation of the spring bar 160. For replacement after wear or failure, the inner bushing 163 is removeable. Furthermore, different sizes of inner bushings 163 can be inserted into outer bushing 165 to accommodate different sized spring bars 160.

The inner bushing 163 attaches to the front member 35 with a spring bar bushing plate 173, which extends outwardly from a lower end of the inner spring bar bushing 163. The bushing plate 173 includes a recess 177 that seats against the outer surface of the bearing 152 located in the front member 35. A fastener extends through the lower plate 90 on the front member 35 and the spring bar bushing plate 173 to secure the inner bushing 163. This arrangement prevents the inner bushing 163 from rotating in tandem with the spring bars 160.

Figure 18:
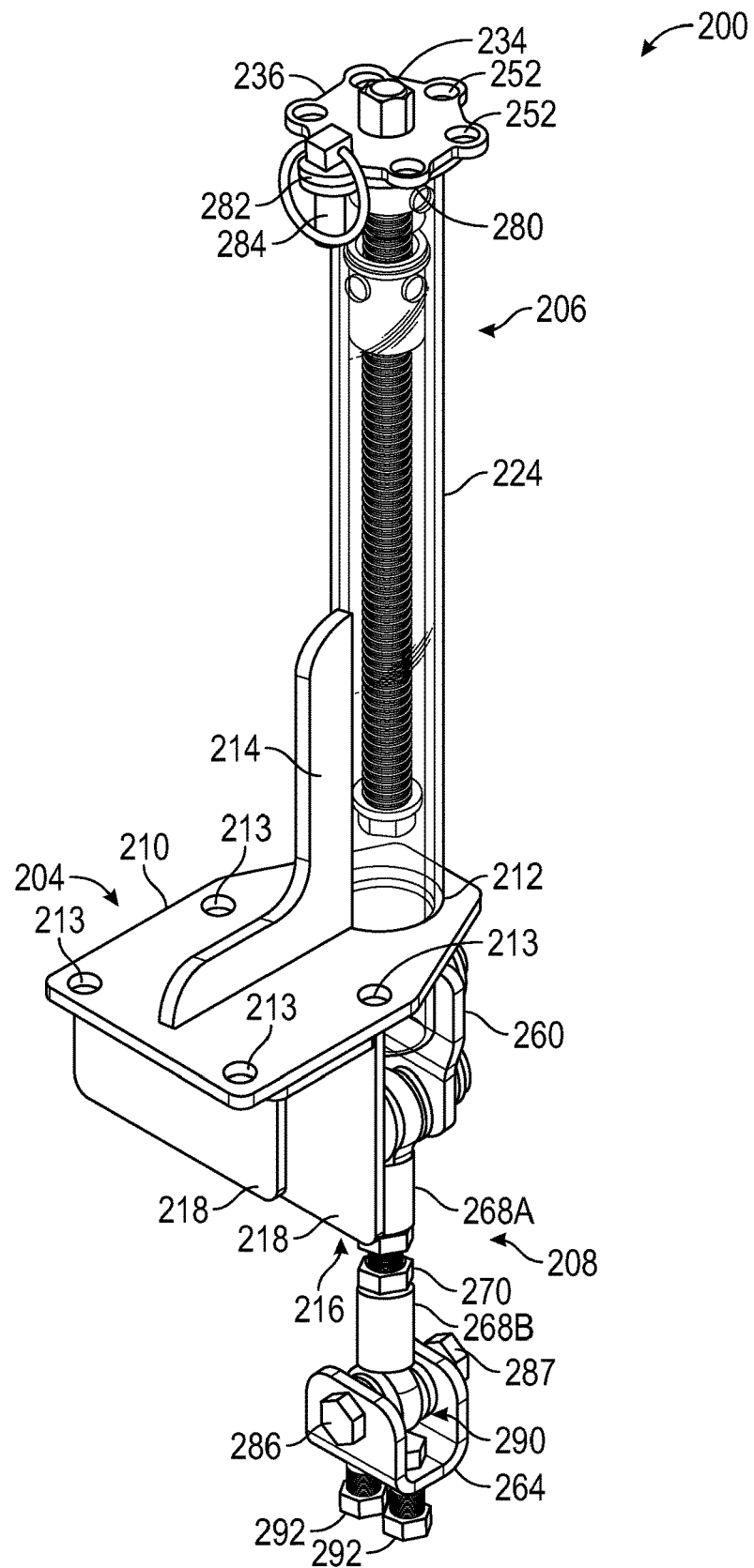
FIG. 18 is a partial side perspective view of the jack assembly.
Figure 19:
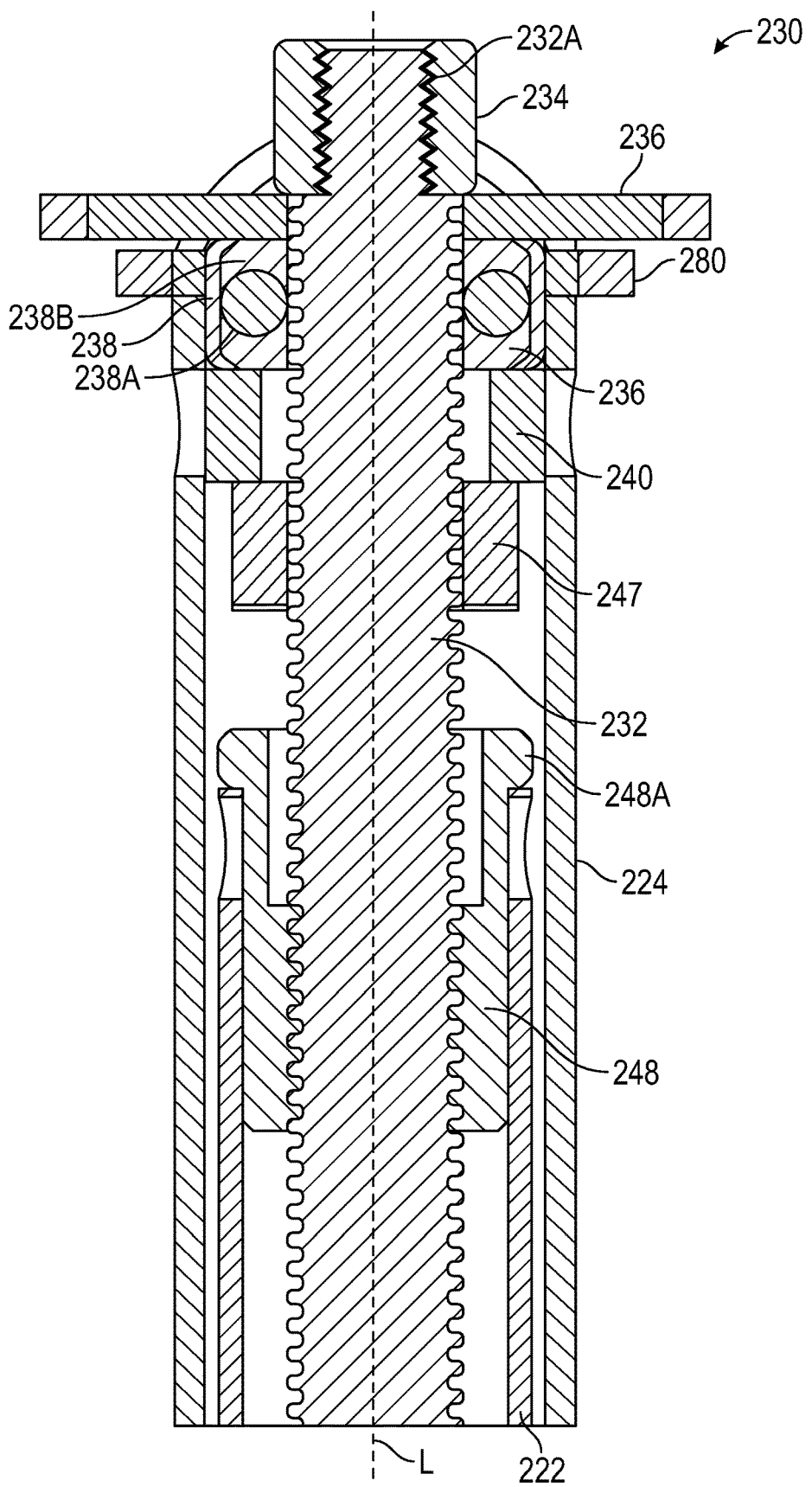
FIG. 19 is an enlarged view of a proximal end of a telescoping assembly on the jack assembly.
Figure 20:
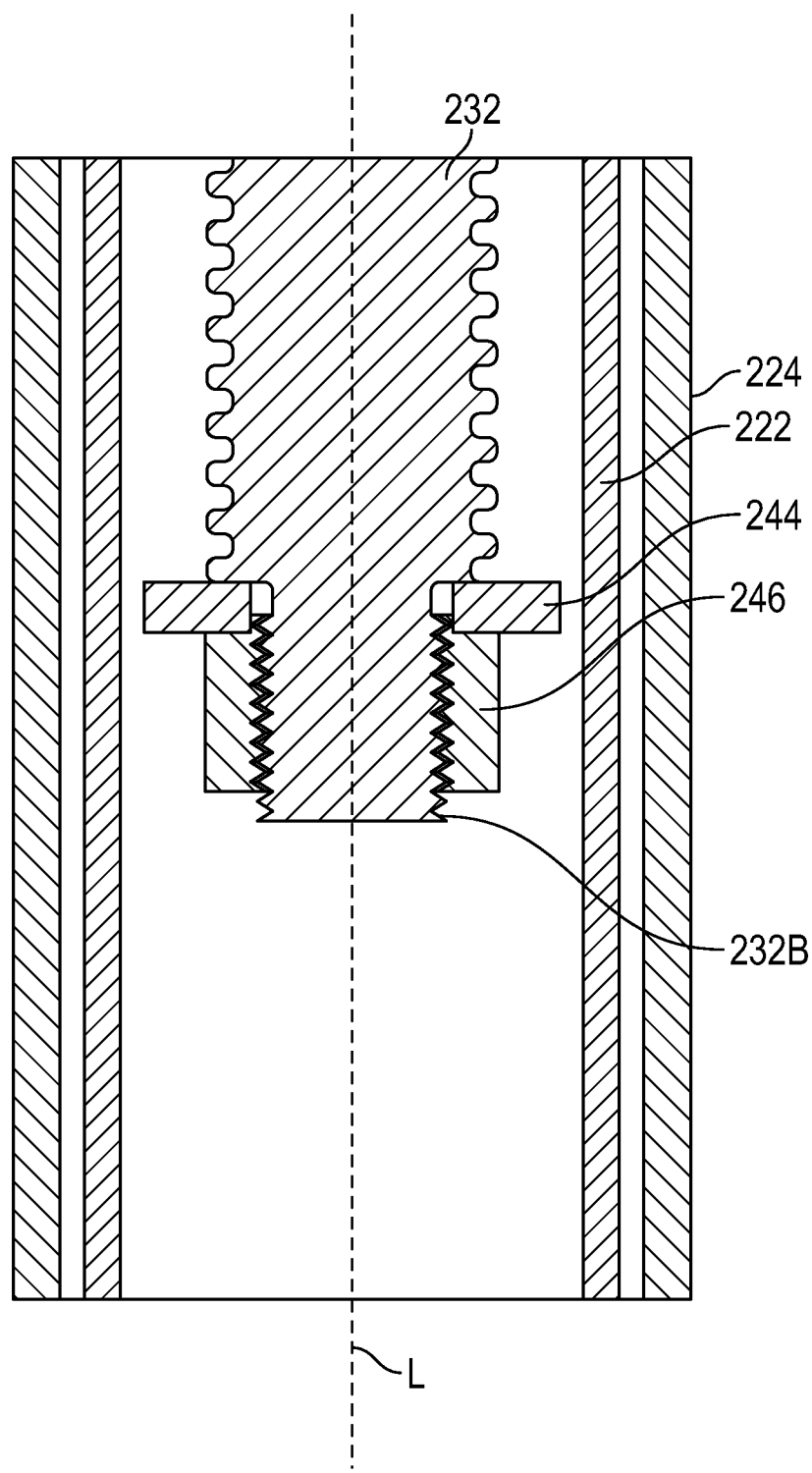
FIG. 20 is an enlarged view of a distal end of the telescoping assembly on the jack assembly.

As shown in FIGS. 2 and 17-18, a pair of jack assemblies 200 separately engage distal ends of each of the spring bars 160 to provide tension in the spring bars 160. Each jack assembly 200 includes a base 204, a telescoping assembly 206, and a link assembly 208. The base 204 includes a base plate 210 that extends perpendicular to the telescoping assembly 206 and includes an opening 212 for accepting a portion of the telescoping assembly 206. A gusset 214 includes a first portion fixedly attached to the base plate 210 and a second portion fixedly attached to the telescoping assembly 206. In one example, the gusset 214 can be fixedly attached to the base plate 210 and the telescoping assembly 206 through a welding process.

In the illustrated example, the base plate 210 includes U-bolt openings 213 to accept U-bolts 217 that secure the jack assembly 200 to a corresponding one of the side members 16 of the trailer T. The U-bolts 217 include threaded ends that engage nuts once passed through the openings 213. One feature of the U-bolts 217 is to prevent the jack assembly 200 from sliding along the side members 16.

A side member passage 216 is located on the base 204 on an opposite side of the base plate 210 from the gusset 214 and is defined by a U-shaped bracket 218. In the illustrated example, the U-shaped bracket 218 includes a first leg adjacent the telescoping assembly 206 having a greater length than a second leg opposite the side member passage 216 from the first leg. One feature of this leg configuration is improved load distribution along an outside face of the side member 16 resulting from a load generated by translational movement of the telescoping assembly 206 when tensioning the spring bars 160. To further distribute this load, a gusset 220 includes a first portion fixedly attached to the base plate 210 and a second portion fixedly attached to the first leg on the U-shaped bracket 218. In one example, the gusset 220 can be fixedly attached to the base plate 210 and the U-shaped bracket 218 through a welding process.

FIGS. 17-20 illustrate the telescoping assembly 206 on the jack assembly 200 with an inner tube 222 and an outer tube 224 in cross-section. In the illustrated example, the outer tube 224 includes an inner diameter that is greater than an outer diameter of the inner tube 222 to allow the inner tube 222 to translate within the outer tube 224. A clearance gap of less than a wall thickness of either the inner or outer tube 222, 224 is formed between the inner and outer tubes 222, 224. One feature of this configuration is a reduction in lateral movement and rattling noises of the tubes 222, 224 during operation.

The telescoping assembly 206 provides translational movement between the inner tube 222 and the outer tube 224 through the use of an elongated threaded shaft 232 that extends along a central longitudinal axis L of the inner and outer tubes 222, 224. A proximal end of the threaded shaft 232 includes a threaded attachment 232A for securing a drive head nut 234 to a proximal end of the threaded shaft 232. The drive head nut 234 is used to rotate the threaded shaft 232 to translate the inner tube 222 as will be described in greater detail below.

The drive head nut 234 also retains an end plate 236 against a ledge on the threaded shaft 232. The end plate 236 is supported relative to the outer tube 224 by a bearing assembly 238. In the illustrated example, the bearing assembly 238 is press fit within the outer tube 224 and protrudes from a proximal end of the outer tube 224. The bearing assembly 238 includes a first race 238A in abutment with a bearing stop 240 and a second race 238B in abutment with the end plate 236. In the illustrated example, the bearing assembly 238 includes ball bearings. However, other types of bearings, such as roller bearings, could be used. The threaded shaft 232 is fixed relative to the outer tube 224 by a set screw collar 247 that is fixed relative to the outer tube 224 and in abutment with the bearing stop 240 and longitudinally spaced from the inner tube 222.

The threaded shaft 232 also engages a threaded plug 248 fixed within a proximal end of the inner tube 222. In the illustrated example, the threaded plug 248 is press fit within a proximal end of the inner tube 222 until a lip 248A on the threaded plug 248 engages the proximal end of the inner tube 222. In another example the threaded plug 248 is attached through another process, such as welding.

A distal end of the threaded shaft 232 includes a second nut threaded portion 232B for accepting a nut 246 that secures a washer 244 relative to the threaded shaft 232. The washer 244 acts as a stop to prevent over extension of the inner tube 222 relative to the outer tube 224 by engaging a distal end of the threaded plug 248.

The threaded shaft 232 can also be locked from rotating to prevent translational movement of the inner tube 222 relative to the outer tube 224. In order to lock the threaded shaft 232, a lock plate 280 is fixed relative to a proximal end of the outer tube 224. As shown in FIGS. 17 and 18, the lock plate 280 is a circular disk with at least one pin opening 282 for accepting a pin 284 that also extends through a corresponding pin opening 252 in the end plate 236. The pin 284 in the corresponding openings 252, 282 prevents further rotational movement of the threaded shaft 232 by locking it relative to the outer tube 224. Additionally, the end plate 236 includes multiple openings 252 that are circumferentially spaced around a perimeter of the end plate 236 to provide multiple rotational locking positions. One feature of having multiple openings 252 is the ability to lock the threaded shaft 232 in a rotational position nearest the desired rotational location as possible.

Figure 21:
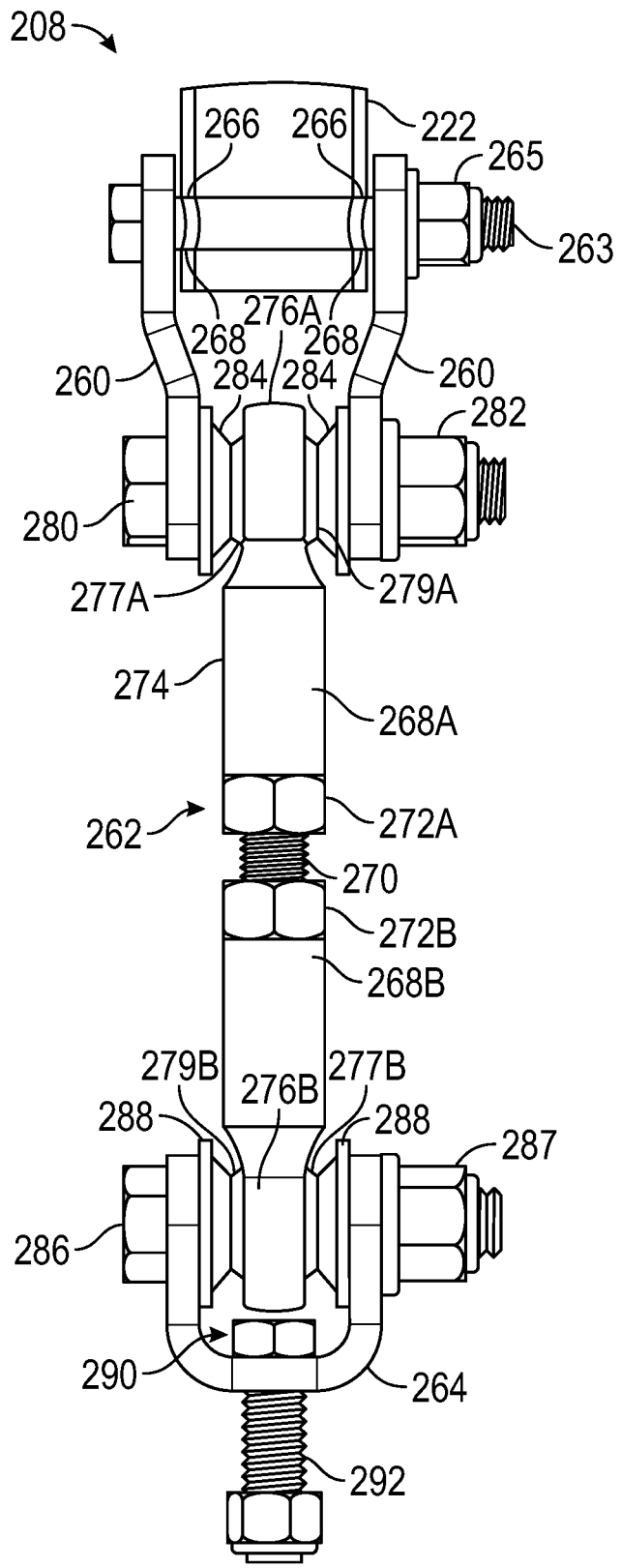
FIG. 21 is an enlarged view of a link assembly on the jack assembly.
Figure 22:
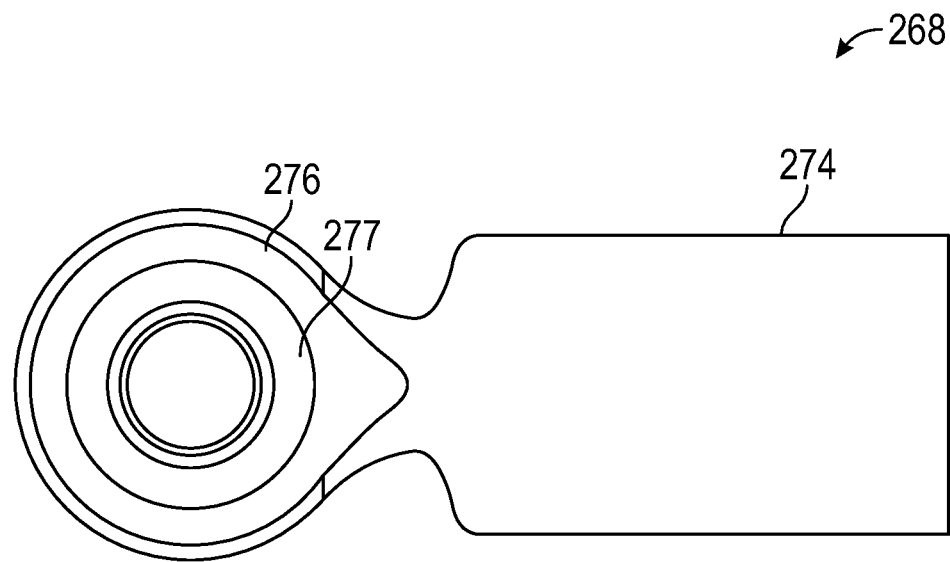
FIG. 22 is a top view of a spherical end link on the link assembly.
Figure 23:
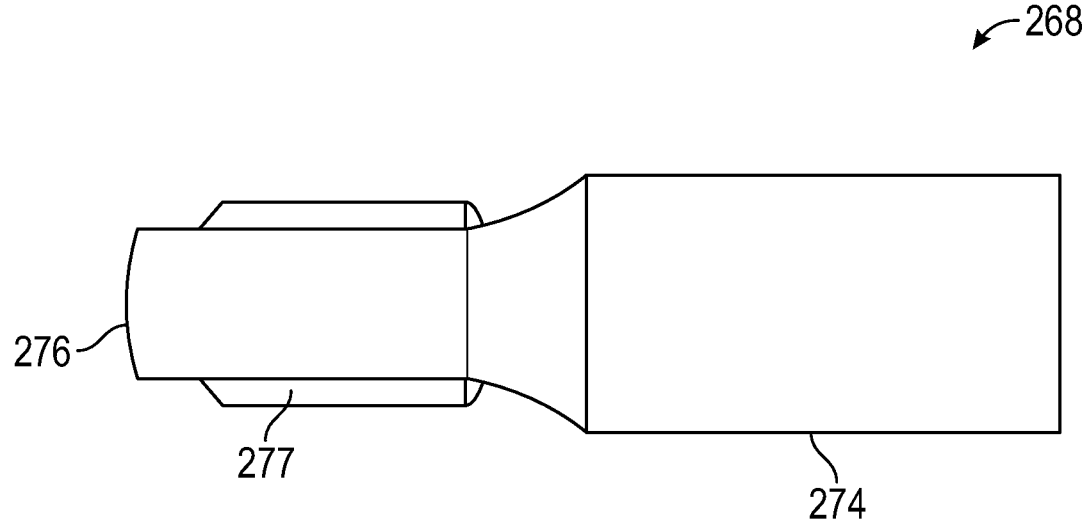
FIG. 23 is a side view of the spherical end link on the link assembly.

As shown in FIGS. 17 and 21, the link assembly 208 is attached to a distal end of the inner tube 222. The link assembly 208 includes a pair of pivoting arms 260 attached to a first end of an adjustable link 262 and a mounting bracket 264 attached to a second end of the adjustable link 262 for connecting to the spring bars 160. However, the adjustable link 262 could be attached directly to the inner tube 222 at the first end and the spring bar 160 at the second end. One feature of the link assembly 208 is to provide both pivotable and rotational movement between the inner tube 222 and a corresponding one of the spring bars 160. This reduces rotational and lateral load transfers from the spring bars 160 to the inner tube 222 that can occur while towing the trailer T.

In the illustrated example, the adjustable link 262 includes a first spherical end link 268A at the first end and a second spherical end link 268B at the second end that are each threaded onto opposing ends of a threaded shaft 270. The threaded connection between threads on a radially inner surface of each of the first and second spherical end links 268A, 268B and the threads on a radially outer surface of the threaded shaft 270 allows for length adjustment of the adjustable link 262. Additionally, first and second locknuts 272A, 272B engage the threads on the threaded shaft 270 and laterally engage a corresponding one of the spherical end links 268A, 268B to prevent the spherical end links 268A, 268B from rotating and moving longitudinally relative to the threaded shaft 270. However, the threads could be on an exterior surface of the first and second spherical links and on an interior surface of the threaded shaft.

As shown in FIGS. 17 and 21-23, the spherical end links 268A, 268B each include an elongated body portion 274A, 274B at a proximal end having a threaded interior surface and a ring 276A, 276B at a distal end for excepting a spherical insert 277A, 277B, respectively. The spherical inserts 277A, 277B includes a central opening 279A, 279B for accepting a fastener, such as a bolt or screw, and a curved or partially spherical outer surface that mates with a correspondingly curved or partially spherical inner surface on the ring 276A, 276B. One feature of having the spherical inserts 277A, 277B within the rings 276A, 276B is the ability to accommodate rotational movement about a central point in two orthogonal directions.

In the illustrated example, the adjustable link 262 is pivotably attached to the inner tube 222 with the pair of pivoting arms 260. An inner tube bolt 263 extends through bolt openings to 266 in the distal end of the inner tube 222 and corresponding bolt openings adjacent a proximal end of the pair of pivoting arms 260. The bolt 263 is secured with a nut 265 that reduces a clearance between the pair of pivoting arms 260 and the inner tube 222 to prevent or reduce lateral movement between the components.

A first link bolt 280 and nut 282 secure the first spherical end link 268A to a distal end of the pair of pivoting arms 260. The bolt 280 passes through the central opening 279A of the insert 277A in the ring 276A of the first spherical end link 268A. A pair of washers 284 have a conical protrusion are in abutment with the spherical insert 277A and a ring portion in abutment with the pivoting arms 260 to allow the adjustable link 262 to pivot about a longitudinal axis of the bolt 280 and orthogonally to the longitudinal axis of the bolt 280.

A second link bolt 286 and nut 287 secure the second spherical end link 268B to the mounting bracket 264 by extending through each lateral side of the mounting bracket 264 and the central opening 279B of the insert 277B in the ring 276B of the second spherical end link 268B. A pair of washers 288 have a conical protrusion in abutment the spherical insert 277B and a ring portion in abutment with the mounting bracket 264 to allow the mounting bracket 264 to pivot about a longitudinal axis of the bolt 286 and orthogonally to the longitudinal axis of the bolt 286.

As shown in FIGS. 17 and 18, the mounting bracket 264 includes a U-shaped cross section forming a channel 290 for accepting the ring 276B of the second spherical end link 268B and a pair of fasteners 292, such as bolts, for attaching the mounting bracket 264 to the spring bar 160.

Once, the jack assemblies 200 are attached to the trailer T and the spring bars 160, tension can be maintaining in the spring bars 160 while still allowing pivotal movement of the spring bars 160 during turns. The jack assemblies 200 should be cranked until appropriate tension is applied to the spring bars 160. The spring bars 160 have long been used in conjunction with trailer hitches to achieve better weight distribution among all the tow vehicle wheels and all the trailer wheels, and the principle will therefore not be described in more detail here.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A jack assembly comprising:
    a base including a frame rail passage;
    a telescoping assembly that extends along a central longitudinal axis and includes:
        an outer tube fixed to the base; and
        an inner tube moveable along the central longitudinal axis within the outer tube to adjust a length of the telescoping tube assembly; and
    a link assembly including:
        a first spherical end link attached to the telescoping assembly with a first spherical joint; and
        a second spherical end link fixed relative to the first spherical end link and having a second spherical joint.

2. The jack assembly of claim 1, wherein the base includes a base plate and a U-shaped bracket defining the frame rail passage.

3. The jack assembly of claim 2, wherein the base plate includes a base plate opening surrounded by a distal end of the outer tube with the inner tube extending through the base plate opening.

4. The jack assembly of claim 3, including:
    a tube gusset directly engaging the base plate and the outer tube; and
    a bracket gusset directly engaging the U-shaped bracket and the base plate.

5. The jack assembly of claim 1, wherein the telescoping assembly includes:
    a threaded shaft extending along the central longitudinal axis;
    a drive head at a proximal end of the threaded shaft;
    an end plate fixed adjacent a proximal end of the threaded shaft; and
    a threaded collar fixed to the inner tube and in threaded engagement with the threaded shaft for moving the inner tube longitudinally along the central longitudinal axis.

6. The jack assembly of claim 5, wherein the end plate is supported on a bearing assembly to rotate relative to the outer tube.

7. The jack assembly of claim 6, including:
    a lock plate that is rotationally fixed relative to the outer tube having at least one pin opening, wherein the at least one pin opening in the lock plate is configured to align with at least one pin opening on the end plate to fix the lock plate from rotating relative to the end plate.

8. The jack assembly of claim 7, including:
    a locking pin extends through one of the at least one openings in the lock plate and one of the at least one pin openings in the end plate to limit rotation of the lock plate with respect to the end plate.

9. The jack assembly of claim 1, including:
    a first pair of pivoting arms having proximal ends pivotably attached to the inner tube and distal ends pivotably attached to the first spherical joint.

10. The jack assembly of claim 9, including:
    an inner tube fastener extending through the proximal ends of the pair of pivoting arms and the inner tube; and
    a first link fastener extends through the distal ends of the pair of pivoting arms and the first spherical joint.

11. The jack assembly of claim 10, wherein the second spherical joint of the second spherical end link is connected to a spring bar.

12. The jack assembly of claim 11, including:
    a second link fastener extending through the second spherical joint; and
    a mounting bracket for attaching to the spring bar.

13. The jack assembly of claim 12, wherein the first spherical joint includes a first ring having a first insert with a first opening for accepting the first link fastener and the second spherical joint includes a second ring having a second insert with a central opening for accepting the second link fastener.

14. The jack assembly of claim 13, wherein
    the mounting bracket defines a channel for accepting the second ring of the second spherical joint and at least one spring bar fastener opening extends through a base of the channel for accepting a fastener aligned with an opening in the spring bar.

15. A hitch assembly comprising:
    jack assembly including:
        a base including a frame rail passage;
        a telescoping assembly that extends along a central longitudinal axis including:
            an outer tube fixed to the base; and
            an inner tube moveable along the central longitudinal axis within the outer tube to adjust a length of the telescoping tube assembly; and
        a link assembly including:
            a first spherical end link attached to the telescoping assembly with a first spherical joint; and a second spherical end link fixed relative to the first spherical end link and having a second spherical joint; and a spring bar pivotably attached to the first spherical link end.

16. The hitch assembly of claim 15, wherein the telescoping assembly includes:
a threaded shaft extending along the central longitudinal axis;
a drive head at a proximal end of the threaded shaft;
an end plate fixed adjacent a proximal end of the threaded shaft; and
a threaded collar fixed to the inner tube and in threaded engagement with the threaded shaft for moving the inner tube longitudinally along the central longitudinal axis.

17. The hitch assembly of claim 16, including:
a lock plate that is rotationally fixed relative to the outer tube having at least one pin opening, wherein the at least one pin opening in the lock plate is configured to align with at least one pin opening on the end plate to fix the lock plate from rotating relative to the end plate.

18. The hitch assembly of claim 17, including:
a locking pin extends through one of the at least one openings in the lock plate and one of the at least one pin openings in the end plate to limit rotation of the lock plate with respect to the end plate.

19. The hitch assembly of claim 15, including:
a first pair of pivoting arms having proximal ends pivotably attached to the inner tube and distal ends pivotably attached to the first spherical joint;
an inner tube fastener extends through the proximal ends of the pair of pivoting arms and the inner tube;
a first link fastener extends through the distal ends of the pair of pivoting arms and the first spherical joint;
a second link fastener extending through the second spherical joint; and
a mounting bracket for attaching to the spring bar.

20. The hitch assembly of claim 19, wherein:
the first spherical joint includes a first ring having a first insert with a first opening for accepting the first link fastener and the second spherical joint includes a second ring having a second insert with a central opening for accepting the second link fastener; and
the mounting bracket defines a channel for accepting the second ring of the second spherical joint and at least one spring bar fastener opening extends through a base of the channel for accepting a fastener aligned with an opening in the spring bar.

* * * * *